United States Patent
Esenlik et al.

(10) Patent No.: US 12,200,269 B2
(45) Date of Patent: Jan. 14, 2025

(54) IMAGE CODING METHOD, IMAGE DECODING METHOD, IMAGE CODING APPARATUS, IMAGE DECODING APPARATUS, AND IMAGE CODING AND DECODING APPARATUS

(71) Applicant: Sun Patent Trust, New York, NY (US)

(72) Inventors: Semih Esenlik, Nazilli (TR); Matthias Narroschke, Schaafheim (DE); Thomas Wedi, The Hague (NL)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 18/585,898

(22) Filed: Feb. 23, 2024

(65) Prior Publication Data

US 2024/0196020 A1 Jun. 13, 2024

Related U.S. Application Data

(63) Continuation of application No. 18/116,520, filed on Mar. 2, 2023, now Pat. No. 11,943,484, which is a
(Continued)

(51) Int. Cl.
*G06V 10/00* (2022.01)
*H04N 19/174* (2014.01)
(Continued)

(52) U.S. Cl.
CPC ........... *H04N 19/70* (2014.11); *H04N 19/174* (2014.11); *H04N 19/30* (2014.11); *H04N 19/423* (2014.11);
(Continued)

(58) Field of Classification Search
CPC ...... H04N 19/174; H04N 19/70; H04N 19/30; H04N 19/423; H04N 19/436; H04N 19/46; H04N 19/52; H04N 19/597; H04N 19/80
See application file for complete search history.

(56) References Cited

U.S. PATENT DOCUMENTS

| 8,126,054 B2 | 2/2012 | Hsiang |
| 8,204,113 B2 | 6/2012 | Kondo |

(Continued)

FOREIGN PATENT DOCUMENTS

| CN | 101868978 | 10/2010 |
| CN | 102177725 | 9/2011 |

(Continued)

OTHER PUBLICATIONS

Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document JCTVC-G1103_d5.
(Continued)

*Primary Examiner* — Amir Alavi
(74) *Attorney, Agent, or Firm* — Wenderoth, Lind & Ponack, L.L.P.

(57) ABSTRACT

A dependency indication is signaled within the beginning of a packet, that is, within the adjacent of a slice header to be parsed or a parameter set. This is achieved, for example, by including the dependency indication at the beginning of the slice header, preferably after a syntax element identifying the parameter set and before the slice address, by including the dependency indication before the slice address, by providing the dependency indication to a NALU header using a separate message, or by using a special NALU type for NALUs carrying dependent slices.

7 Claims, 37 Drawing Sheets

Related U.S. Application Data continuation of application No. 16/799,591, filed on Feb. 24, 2020, now Pat. No. 11,632,572, which is a continuation of application No. 15/824,133, filed on Nov. 28, 2017, now Pat. No. 10,616,605, which is a continuation of application No. 15/295,033, filed on Oct. 17, 2016, now Pat. No. 9,872,043, which is a continuation of application No. 15/140,754, filed on Apr. 28, 2016, now Pat. No. 9,503,755, which is a continuation of application No. 14/603,961, filed on Jan. 23, 2015, now Pat. No. 9,357,234, which is a continuation of application No. 14/033,568, filed on Sep. 23, 2013, now Pat. No. 9,014,494.

(60) Provisional application No. 61/711,892, filed on Oct. 10, 2012, provisional application No. 61/705,846, filed on Sep. 26, 2012.

(51) Int. Cl.
| | | |
|---|---|---|
| *H04N 19/30* | | (2014.01) |
| *H04N 19/423* | | (2014.01) |
| *H04N 19/436* | | (2014.01) |
| *H04N 19/46* | | (2014.01) |
| *H04N 19/52* | | (2014.01) |
| *H04N 19/597* | | (2014.01) |
| *H04N 19/70* | | (2014.01) |

(52) U.S. Cl.
CPC .......... *H04N 19/436* (2014.11); *H04N 19/46* (2014.11); *H04N 19/52* (2014.11); *H04N 19/597* (2014.11)

(56) References Cited

U.S. PATENT DOCUMENTS

| | | | | |
|---|---|---|---|---|
| 8,315,304 | B2 | 11/2012 | Lee | |
| 8,634,462 | B2 | 1/2014 | Narroschke | |
| 9,014,494 | B2 * | 4/2015 | Esenlik | H04N 19/52 |
| | | | | 382/233 |
| 9,036,697 | B2 * | 5/2015 | Esenlik | H04N 19/436 |
| | | | | 382/233 |
| 9,100,634 | B2 * | 8/2015 | Esenlik | H04N 19/174 |
| 9,161,039 | B2 * | 10/2015 | Wang | H04N 19/70 |
| 9,232,236 | B2 | 1/2016 | Narroschke | |
| 9,258,573 | B2 | 2/2016 | Drugeon | |
| 9,264,716 | B2 | 2/2016 | Kim | |
| 9,357,234 | B2 * | 5/2016 | Esenlik | H04N 19/52 |
| 9,503,755 | B2 * | 11/2016 | Esenlik | H04N 19/423 |
| 9,516,342 | B2 | 12/2016 | Gisquet | |
| 9,872,043 | B2 * | 1/2018 | Esenlik | H04N 19/52 |
| 10,027,989 | B2 * | 7/2018 | Doshi | H04N 19/44 |
| 10,491,907 | B2 | 11/2019 | Laroche | |
| 10,616,605 | B2 * | 4/2020 | Esenlik | H04N 19/436 |
| 10,972,725 | B2 | 4/2021 | Wang | |
| 11,070,804 | B2 | 7/2021 | Gao | |
| 11,632,572 | B2 * | 4/2023 | Esenlik | H04N 19/46 |
| | | | | 382/233 |
| 11,876,962 | B2 * | 1/2024 | Taquet | H04N 19/188 |
| 11,943,484 | B2 * | 3/2024 | Esenlik | H04N 19/52 |
| 2008/0317124 | A1 | 12/2008 | Cho | |
| 2009/0175349 | A1 | 7/2009 | Ye et al. | |
| 2010/0189181 | A1 | 7/2010 | Zheng et al. | |
| 2013/0003830 | A1 | 1/2013 | Misra et al. | |
| 2013/0343465 | A1 | 12/2013 | Chen et al. | |
| 2014/0056356 | A1 | 2/2014 | Yu | |
| 2014/0086328 | A1 | 3/2014 | Chen | |
| 2014/0092963 | A1 | 4/2014 | Wang | |
| 2014/0092978 | A1 | 4/2014 | Bugdayci | |
| 2014/0211841 | A1 | 7/2014 | Samuelsson | |
| 2015/0341672 | A1 * | 11/2015 | Lee | H04N 19/50 |
| | | | | 375/240.12 |
| 2018/0084282 | A1 | 3/2018 | Esenlik et al. | |
| 2018/0278952 | A1 | 9/2018 | Han | |

FOREIGN PATENT DOCUMENTS

| | | |
|---|---|---|
| CN | 102378976 | 3/2012 |
| JP | 2011-066872 | 3/2011 |
| RU | 2010 133 234 | 2/2012 |

OTHER PUBLICATIONS

ITU-T Recommendation H.264, "Series H: Audiovisual and Multimedia Systems; Infrastructures of audiovisual services—Coding of moving video; Advanced video coding for generic audiovisual services", ITU-T, Telecommunication Standardization Sector of ITU, May 2003.

Bross et al., "High efficiency video coding (HEVC) text specification draft 7", Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, Document JCTVC-I1003_d5.

Suehring et al., "High level syntax parsing issues", Joint Collaborative Team on Video Coding (JCT-VC) of ITU-T SG 16 WP3 and ISO/IEC JTC1/SC29/WG11, 9th Meeting: Geneva, CH, Apr. 27-May 7, 2012, Document JCTVC-I0113.

Fuldseth, et al., "Tiles", JCTVC-F355-v1, Joint Collaborative Team on Video Coding (JCT-VC) of ITU-T SG16 WP3 and ISO/IEC JTC1/SC29/WG 11 6th Meeting: Torino, Jul. 2011.

European Search Report mailed Feb. 22, 2018 in EP Application 17201617.2.

English translation of Russian Office Action mailed Sep. 13, 2017 in Russian application 2015103543.

Schierl et al., "Dependent slices support in HEVC main profile", JCTVC-J0264 (version 1), published on Jul. 2, 2012, on 3 pages [found on Sep. 12, 2017 and printed on Nov. 17, 2017], found in Internet at URL:http://phenix.it-sudparis.eu/jct/doc_end_user/current_document.php?id=6127.

Office Action mailed May 2, 2017 in U.S. Appl. No. 15/295,033.

Notice of Allowance mailed Aug. 30, 2017 in U.S. Appl. No. 15/295,033.

Chinese Office Action and English Search Report mailed Jul. 4, 2017 in CN application 201380045711.4.

Extended European Search Report issued Jan. 2, 2017 in corresponding European Application No. 16179058.9.

Gordon Clare et al., "Wavefront Parallel Processing for HEVC Encoding and Decoding", Joint Collaborative Team on Video Coding (JCT-VC) of ITU-T SG16 WP3 and ISO/IEC JTC1/SC29/WG11, JCTVC-F274, Ver.2, 6th Meeting: Torino, IT, Jul. 14-22, 2011.

Sung-Chang Lim et al., "CE4 Subtest2: Cross-check report of Sony's proposal JCTVC-F420 (tests 2.3.d and 2.3.e) by ETRI", Joint Collaborative Team on Video Coding (JCT-VC) of ITU-T SG16 WP3 and ISO/IEC JTC1/SC29/WG11, JCTVC-F355, Ver.1, 6th Meeting: Torino, Jul. 14-22, 2011.

Benjamin Bross et al., "High efficiency video coding (HEVC) text specification draft 8", Joint Collaborative Team on Video Coding (JCT-VC) of ITU-T SG16 WP3 and ISO/IEC JTC1/SC29/WG11, JCTVC-J1003_d7, Ver.8, 10th Meeting: Stockholm, SE, Jul. 11-20, 2012.

International Search Report mailed Dec. 3, 2013 in corresponding PCT application No. PCT/JP2013/005541.

T. Schierl et al., "Dependent Slices", Joint Collaborative Team on Video Coding (JCT-VC) of ITU-T SG 16 WP 3 and ISO/IEC JTC 1/SC 29/WG 11, JCTVC-10229r2, 9th Meeting: Geneva, CH, May 2012, pp. 1-8.

Tammy Lee and Jeonghoon Park, "On dependent slices", Joint Collaborative Team on Video Coding (JCT-VC) of ITU-T SG 16 WP 3 and ISO/IEC JTC 1/SC 29/WG 11, JCTVC-J0217_r1, 10th Meeting: Stockholm, SE, Jul. 2012, pp. 1-7.

Semih Esenlik et al., "AHG9: On dependent slices syntax", Joint Collaborative Team on Video Coding (JCT-VC) of ITU-T SG 16 WP 3 and ISO/IEC JTC 1/SC 29/WG 11, JCTVC-K0184_r2, 11th Meeting: Shanghai, Oct. 2012, pp. 1-8.

Extended European Search Report issued Aug. 10, 2015 in corresponding European Application No. 13841488.3.

(56) References Cited

OTHER PUBLICATIONS

Tammy Lee et al., "On dependent slices", Joint Collaborative Team on Video Coding (JCT-VC) of ITU-T SG16 WP3 and ISO/IEC JTC1/SC29/WG11, 10$^{th}$ Meeting: Stockholm, SE, Jul. 11-20, 2012, Document: JCTVC-J0217, Jul. 2, 2012, XP030112579.

T. Schierl et al., "Dependent Slices", Joint Collaborative Team on Video Coding (JCT-VC) of ITU-T SG16 WP3 and ISO/IEC JTC1/SC29/WG11, 9$^{th}$ Meeting: Geneva, CH, Apr. 27-May 7, 2012, Document: JCTVC-I0229, Apr. 16, 2012, XP030111992.

Benjamin Bross et al., "High efficiency video coding (HEVC) text specification draft 8", Joint Collaborative Team on Video Coding (JCT-VC) of ITU-T SG16 WP3 and ISO/IEC JTC1/SC29/WG11, 10$^{th}$ Meeting: Stockholm, SE, Jul. 11-20, 2012, Document: JCTVC-J1003_d0, Jul. 23, 2012, XP030112947.

Muhammed Coban et al., "On tiles and wavefront parallel processing", Joint Collaborative Team on Video Coding (JCT-VC) of ITU-T SG16 WP3 and ISO/IEC JTC1/SC29/WG11, 10$^{th}$ Meeting: Stockholm, SE, Jul. 11-20, 2012, Document JCTVC-J0123, Jul. 3, 2012, XP030112485.

Rickard Sjoberg et al., "Overview of HEVC high-level syntax and reference picture management", IEEE Transactions on Circuits and Systems for Video Technology, Jan. 1, 2012, XP055045360.

Semih Esenlik et al., "AHG9: On dependent slices syntax", Joint Collaborative Team on Video Coding (JCT-VC) of ITU-T SG16 WP3 and ISO/IEC JTC1/SC29/WG11, 11th Meeting: Shanghai, CN, Oct. 10-19, 2012, Document JCTVC-K0184, Oct. 1, 2012, XP030113066.

Notice of Allowance mailed Jul. 21, 2016 in U.S. Appl. No. 15/140,754.

Office Action mailed Sep. 29, 2015 in U.S. Appl. No. 14/603,961.

Notice of Allowance mailed Feb. 5, 2016 in U.S. Appl. No. 14/603,961.

Office Action mailed Aug. 6, 2014 in U.S. Appl. No. 14/033,568.

Notice of Allowance mailed Oct. 28, 2014 in U.S. Appl. No. 14/033,568.

Office Action mailed Jul. 26, 2018 in U.S. Appl. No. 15/824,133.

Final Office Action mailed Jan. 8, 2019 in U.S. Appl. No. 15/824,133.

Advisory Action mailed Apr. 22, 2019 in U.S. Appl. No. 15/824,133.

Office Action mailed Aug. 15, 2019 in U.S. Appl. No. 15/824,133.

Notice of Allowance mailed Dec. 4, 2019 in U.S. Appl. No. 15/824,133.

JCTVC-J0184, Morigami et al., "On Transform Skip", Joint Collaborative Team on Video Coding (JCT-VC) of ITU-T SG 16 WP 3 and ISO/IEC JTC 1/SC 29/WG11, 10$^{th}$ Meeting: Stockholm, SE, Jul. 11-20, 2012.

JCTVC-J0288, Van der Auwera et al., "On Loop Filter Disabling", Joint Collaborative Team on Video Coding (JCT-VC) of ITU-T SG 16 WP 3 and ISO/IEC JTC 1/SC 29/WG 11, 10$^{th}$ Meeting: Stockholm, SE, Jul. 11-20, 2012.

\* cited by examiner

FIG. 6

| slice_header( ) { | Descriptor |
|---|---|
| first_slice_in_pic_flag | u(1) |
| if( RapPicFlag ) | |
| no_output_of_prior_pics_flag | u(1) |
| pic_parameter_set_id | ue(v) |
| if( !first_slice_in_pic_flag ) | |
| slice_address | u(v) |
| if( dependent_slice_enabled_flag && !first_slice_in_pic_flag ) | |
|   dependent_slice_flag | u(1) |
| if( dependent_slice_flag == 0 ) slice_heade_info | |
| if( tiles_or_entropy_coding_sync_idc == 1 \|\| | |
|   tiles_or_entropy_coding_sync_idc == 2 ) { | |
| num_entry_point_offsets | ue(v) |
| if( num_entry_point_offsets > 0 ) { | |
| offset_len_minus1 | ue(v) |
| for( i = 0; i < num_entry_point_offsets; i++ ) | |
|   entry_point_offset( i ) | u(v) |
| } | |
| } | |

601 — Dependent slice flag
602 — Number of CABAC streams in slice
603 — Number of bytes of substream (navigation is easier within bitstream)

FIG. 9A

| nal_unit_header( ) { | Descriptor |
|---|---|
| forbidden_zero_bit | f(1) |
| nal_unit_type | u(6) |
| nuh_reserved_zero_6bits | u(6) |
| nuh_temporal_id_plus1 | u(3) |
| } | |

910

Layer dependencies
Temporal dependencies

| slice_header ( ) { | Descriptor |
|---|---|
| first_slice_in_pic_flag | u(1) |
| if( RapPicFlag ) | |
| no_output_of_prior_pics_flag | u(1) |
| pic_parameter_set_id | ue(v) |
| if( !first_slice_in_pic_flag ) | |
| slice_address | u(v) |
| if( dependent_slice_enabled_flag && !first_slice_in_pic_flag ) | |
| dependent_slice_flag | u(1) |
| if( !dependent_slice_flag ) { | |
| slice_type | ue(v) |
| ... | |

920

Dependent/entropy slice on or off

FIG. 9B

| | Descriptor |
|---|---|
| seq_parameter_set_rbsp( ) { | |
| video_parameter_set_id | u(4) |
| sps_max_sub_layers_minus1 | u(3) |
| sps_reserved_zero_bit | u(1) |
| profile_and_level( 1, sps_max_sub_layers_minus1 ) | |
| seq_parameter_set_id | ue(v) |
| chroma_format_idc | ue(v) |
| if( chroma_format_idc == 3 ) | |
| separate_colour_plane_flag | u(1) |
| pic_width_in_luma_samples ~931 | ue(v) |
| pic_height_in_luma_samples ~932 | ue(v) |
| pic_cropping_flag | u(1) |
| if( pic_cropping_flag ) { | |
| pic_crop_left_offset | ue(v) |
| pic_crop_right_offset | ue(v) |
| pic_crop_top_offset | ue(v) |
| pic_crop_bottom_offset | ue(v) |
| } | |
| bit_depth_luma_minus8 | ue(v) |
| bit_depth_chroma_minus8 | ue(v) |
| pcm_enabled_flag | u(1) |
| if( pcm_enabled_flag ) { | |
| pcm_sample_bit_depth_luma_minus1 | u(4) |
| pcm_sample_bit_depth_chroma_minus1 | u(4) |
| } | |
| log2_max_pic_order_cnt_lsb_minus4 | ue(v) |
| for( i=0; i <= sps_max_sub_layers_minus1; i++ ) { | |
| sps_max_dec_pic_buffering[ i ] | ue(v) |
| sps_max_num_reorder_pics[ i ] | ue(v) |
| sps_max_latency_increase[ i ] | ue(v) |
| } | |
| restricted_ref_pic_lists_flag | u(1) |
| if( restricted_ref_pic_lists_flag ) | |
| lists_modification_present_flag | u(1) |
| log2_min_coding_block_size_minus3 ~933 | ue(v) |
| log2_diff_max_min_coding_block_size ~934 | ue(v) |
| ... | |

930

935

920

| slice_header( ) { |
|---|
| first_slice_in_pic_flag |
| if( RapPicFlag ) |
| no_output_of_prior_pics_flag |
| pic_parameter_set_id |
| if( first_slice_in_pic_flag ) |
| slice_address |
| if( dependent_slice_enabled_flag && !first_slice_in_pic_flag ) |
| dependent_slice_flag |
| if( !dependent_slice_flag ) { |
| slice_type |
| ... |

In order to parse slice_address, syntax elements from SPS are needed. Therefore, SPS needs to be parsed up to this point.

FIG. 11

| slice_header() { | Descriptor |
|---|---|
| first_slice_in_pic_flag | u(1) |
| if( dependent_slice_enabled_flag && !first_slice_in_pic_flag ) | |
| dependent_slice_flag | u(1) |
| if( RapPicFlag ) | |
| no_output_of_prior_pics_flag | u(1) |
| pic_parameter_set_id | ue(v) |
| if( !first_slice_in_pic_flag ) | |
| slice_address | u(v) |
| if( !dependent_slice_flag ) { | |
| slice_type | ue(v) |
| ... ... | ... |

| nal_unit_header( ) { | Descriptor |
|---|---|
| forbidden_zero_bit | f(1) |
| nal_unit_type | u(6) |
| nuh_reserved_zero_6bits | u(6) |
| nuh_temporal_id_plus1 | u(3) |
| } | |

1210

| slice_header( ) { | Descriptor |
|---|---|
| dependent_slice_flag | u(1) |
| if( dependent_slice_flag) | |
| first_slice_in_pic_flag | u(1) |
| if( RapPicFlag ) | |
| no_output_of_prior_pics_flag | u(1) |
| pic_parameter_set_id | ue(v) |
| if( !first_slice_in_pic_flag ) | |
| slice_address | u(v) |
| if( !dependent_slice_flag ) { | |
| slice_type | ue(v) |
| ... ... | |

| slice_header( ) { | Descriptor |
|---|---|
| first_slice_in_pic_flag | u(1) |
| if( RapPicFlag ) | |
| no_output_of_prior_pics_flag | u(1) |
| pic_parameter_set_id | ue(v) |
| if( dependent_slice_enabled_flag && !first_slice_in_pic_flag ) | |
| dependent_slice_flag | u(1) |
| if( !first_slice_in_pic_flag ) | |
| slice_address | u(v) |
| if( !dependent_slice_flag ) { | |
| slice_type | ue(v) |
| ... ... | |

| nal_unit_header( ) { | Descriptor |
|---|---|
| forbidden_zero_bit | f(1) |
| nal_unit_type | u(6) |
| nuh_reserved_zero_6bits | u(5) |
| nuh_temporal_id_plus1 | u(3) |
| dependent_slice_flag | u(1) |
| } | |

FIG. 15

| nal_unit_header( ) { | Descriptor |
|---|---|
| forbidden_zero_bit | f(1) |
| nal_unit_type | u(6) |
| nuh_reserved_zero_6bits | u(6) |
| nuh_temporal_id_plus1 | u(3) |
| } | |

1510

| slice_header( ) { | Descriptor |
|---|---|
| first_slice_in_pic_flag | u(1) |
| if( RapPicFlag ) | |
| no_output_of_prior_pics_flag | u(1) |
| pic_parameter_set_id | ue(v) |
| if( !first_slice_in_pic_flag ) | |
| slice_address | u(v) |
| if( nal_unit_type == 15 \|\| nal_unit_type == 16 ) | |
| dependent_slice_flag == 1 | |
| if( !dependent_slice_flag ) { | |
| slice_type | ue(v) |
| ... ... | ... |

| nal_unit_header( ) { | Descriptor |
|---|---|
| forbidden_zero_bit | f(1) |
| nal_unit_type | u(6) |
| nuh_reserved_zero_6bits | u(6) |
| nuh_temporal_id_plus1 | u(3) |
| } | |

1610

| slice_header( ) { | Descriptor |
|---|---|
| first_slice_in_pic_flag | u(1) |
| if( RapPicFlag ) | |
| no_output_of_prior_pics_flag | u(1) |
| pic_parameter_set_id | ue(v) |
| if( !first_slice_in_pic_flag ) | |
| slice_address | u(v) |
| if( dependent_slice_enabled_flag && !first_slice_in_pic_flag ) | |
| dependent_slice_flag | u(1) |
| if( !dependent_slice_flag ) { | |
| slice_type | ue(v) |
| ... ... | |

| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 34

| Corresponding standard | Driving frequency |
|---|---|
| MPEG-4 AVC | 500 MHz |
| MPEG-2 | 350 MHz |
| ⋮ | ⋮ |

IMAGE CODING METHOD, IMAGE DECODING METHOD, IMAGE CODING APPARATUS, IMAGE DECODING APPARATUS, AND IMAGE CODING AND DECODING APPARATUS

CROSS REFERENCE TO RELATED APPLICATIONS

This is a continuation of application Ser. No. 18/116,520, filed Mar. 2, 2023, which is a continuation of application Ser. No. 16/799,591, filed Feb. 24, 2020, now U.S. Pat. No. 11,632,572, which is a continuation of application Ser. No. 15/824,133, filed Nov. 28, 2017, now U.S. Pat. No. 10,616,605, which is a continuation of application Ser. No. 15/295,033, filed Oct. 17, 2016, now U.S. Pat. No. 9,872,043, which is a continuation of application Ser. No. 15/140,754, filed Apr. 28, 2016, now U.S. Pat. No. 9,503,755, which is a continuation of application Ser. No. 14/603,961, filed Jan. 23, 2015, now U.S. Pat. No. 9,357,234, which is a continuation of application Ser. No. 14/033,568, filed Sep. 23, 2013, now U.S. Pat. No. 9,014,494, which claims the benefit of U.S. Provisional Patent Application No. 61/705,846 filed on Sep. 26, 2012 and U.S. Provisional Patent Application No. 61/711,892 filed on Oct. 10, 2012. The entire disclosures of the above-identified applications, including the specifications, drawings and claims are incorporated herein by reference in their entirety.

FIELD

The present disclosure relates to an image coding method of coding an image and an image decoding method of decoding an image.

BACKGROUND

The majority of current standardized video coding algorithms are based on hybrid video coding. In hybrid video coding methods, several different lossless and lossy compression schemes are used in order to achieve the desired compression gain. Hybrid video coding is also the basis for ITU-T standards (H.26x standards such as H.261, H.263) as well as ISO/IEC standards (MPEG-X standards such as MPEG-1, MPEG-2, and MPEG-4).

The most recent and advanced video coding standard is currently the standard denoted as H.264/MPEG-4 advanced video coding (AVC). This is a result of standardization efforts by joint video team (JVT), a joint team of ITU-T and ISO/IEC MPEG groups.

Moreover, a video coding standard called High-Efficiency Video Coding (HEVC) is being considered by Joint Collaborative Team on Video Coding (JCT-VC), with the particular aim of improving efficiency regarding the high-resolution video coding.

CITATION LIST

Non Patent Literature

Non Patent Literature 1: C. Gordon, et al., "Wavefront Parallel Processing for HEVC Encoding and Decoding", JCTVC-F274-v2, from the Meeting in Torino, July 2011, Internet <URL: http://phenix. int-evry. fr.>

Non Patent Literature 2: A. Fuldseth, et al., "Tiles", JCTVC-F355-v1, from the Meeting in Torino, July 2011, Internet <URL: http://phenix. int-evry. fr.>

Non Patent Literature 3: JCTVC-J1003_d7, "High efficiency video coding (HEVC) text specification draft 8", July 2012, page 73, "dependent_slice_flag", Internet <URL: http://phenix. IT-sudparis. eu/jct/>

SUMMARY

Technical Problem

However, there is a problem that an image coding method, an image decoding method, and the like do not have sufficient processing efficiency.

Therefore, the present disclosure provides an image coding method and an image decoding method that are capable of increase processing efficiency.

Solution to Problem

An image coding method according to an aspect of the present disclosure is an image coding method of performing coding processing by partitioning a picture into a plurality of slices, the image coding method comprising transmitting a bitstream which includes: a dependent slice enabling flag indicating whether or not the picture includes a dependent slice on which the coding processing is performed depending on a result of the coding processing on a slice different from a current slice; a slice address indicating a starting position of the current slice; and a dependency indication indicating whether or not the current slice is the dependent slice, wherein the dependent slice enabling flag is disposed in a parameter set common to the slices, the slice address is disposed in a slice header of the current slice, and the dependency indication is disposed in the slice header, and is disposed before the slice address and after a syntax element identifying the parameter set.

An image decoding method according to an aspect of the present disclosure is an image decoding method of performing decoding processing by partitioning a picture into a plurality of slices, the image decoding method comprising extracting, from a coded bitstream, a dependent slice enabling flag indicating whether or not the picture includes a dependent slice on which the decoding processing is performed depending on a result of the decoding processing on a slice different from a current slice, a slice address indicating a starting position of the current slice, and a dependency indication indicating whether or not the current slice is the dependent slice, wherein the dependent slice enabling flag is disposed in a parameter set common to the slices, the slice address is disposed in a slice header of the current slice, and the dependency indication is disposed in the slice header, and is disposed before the slice address and after a syntax element identifying the parameter set.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

An image coding method and an image decoding method according to the present disclosure are capable of increasing coding efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 6 is a diagram showing an example of a slice header of an entropy slice or a dependent slice.

FIG. 9A is a diagram showing an example of showing a syntax implementation of the inter-layer dependencies, temporal dependencies and inter-slice dependencies in HM8.0.

FIG. 9B is a diagram for explaining parsing steps to be performed for parsing the inter-layer dependencies in HM8.0.

FIG. 11 is a diagram showing an example of syntax when the parsing condition regarding dependent_slice_enabled_flag in FIG. 10 is removed.

FIG. 12 is a diagram showing an example of syntax when the dependent_slice_flag is moved before the first_slice_in_pic_flag.

FIG. 13 is a diagram showing an example of syntax when the dependent_slice_flag is moved before the slice_address syntax element.

FIG. 14 is a diagram showing an example of syntax when the dependent_slice_flag is moved within the NAL header.

FIG. 15 is a diagram showing an example of syntax of a slice header of a dependent slice when a new type is added to NAL unit types used for dependent slices.

FIG. 16 is a diagram showing an example of syntax of a slice header and of a NAL unit header when it is assumed that the dependent_slice_flag is set to 1 for certain NALU types.

FIG. 23 illustrates a structure of multiplexed data.

FIG. 34 shows an example of a look-up table in which video data standards are associated with driving frequencies.

DESCRIPTION OF EMBODIMENTS (Underlying Knowledge Forming Basis of the Present Disclosure)

Regarding the image coding method and the image decoding method described in the Background section, the inventors have found the following problem.

First, an image coding apparatus and an image decoding apparatus in HEVC will be described.

A video signal inputted to an image coding apparatus is a sequence of images called frames (pictures). Each frame includes a two-dimensional matrix of pixels. All the above-mentioned standards based on hybrid video coding include partitioning each individual video frame into smaller blocks including a plurality of pixels. The size of the blocks may vary, for instance, in accordance with the content of the image. The coding method may be typically varied on a per block basis. The largest possible size for such a block, for instance in HEVC, is 64×64 pixels. It is called the largest coding unit (LCU). The LCU can be recursively partitioned into 4 CUs.

In H.264/MPEG-4 AVC, a macroblock (usually denoting a block of 16×16 pixels) was the basic image element, for which the coding is performed. The macroblock is further divide it in smaller subblocks. The coding steps included in the coding method and/or the decoding steps included in the decoding method are performed on a per subblock basis.

[1-1. Hybrid Video Coding]

The following simply describes a hybrid video coding.

Typically, the coding steps of a hybrid video coding include a spatial and/or a temporal prediction (space prediction and/or time prediction). Accordingly, each block to be coded is first predicted using either the blocks in its spatial neighborhood or blocks in its temporal neighborhood, that is, from previously coded video frames. A residual block which is a difference between the block to be coded and its prediction result is then calculated. Next, the residual block is transformed from the spatial (pixel) domain into a frequency domain. The transformation aims at reducing the correlation of the input block.

Furthermore, the transform coefficients obtained from the transformation are quantized. This quantization is the lossy (irreversible) compression. Usually, the compressed transform coefficient values are further losslessly compressed by an entropy coding. In addition, auxiliary information necessary for reconstruction of the coded video signal is coded and provided together with the coded video signal. This is for example information about the spatial prediction, the temporal prediction, and/or quantization.

[1-2. Configuration of Image Coding Apparatus]

Figure 1:
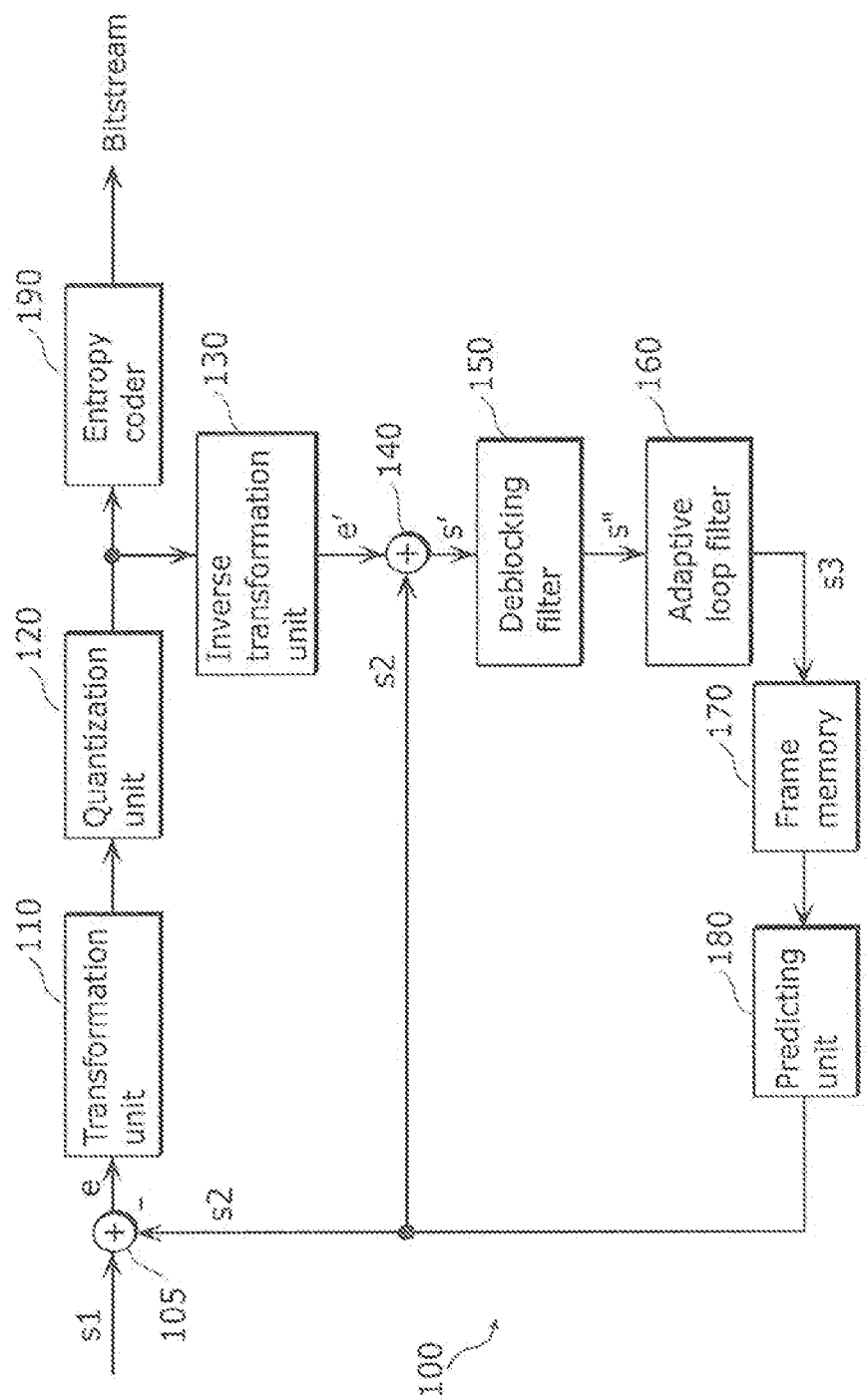
FIG. 1 is a block diagram showing an example of an encoder conforming to HEVC.

FIG. 1 is an example of a typical H.264/MPEG-4 AVC and/or HEVC image coding apparatus (encoder 100).

As shown in FIG. 1, the encoder 100 includes a subtractor 105, a transformation unit 110, a quantization unit 120, an inverse transformation unit 130, an adder 140, a deblocking filter 150, an adaptive loop filter 160, a frame memory 170, a predicting unit 180, and an entropy coder 190.

The predicting unit 180 drives a prediction signal s2 by temporal prediction or spatial prediction. The type of prediction used in the predicting unit 180 may be varied on a per frame basis or on a per block basis. Temporal prediction is called inter prediction, and spatial prediction is called intra prediction. The coding using a prediction signal s2 by temporal prediction is called inter coding, and the coding using a prediction signal s2 by spatial prediction is called intra coding. In the derivation of a prediction signal using temporal prediction, coded images stored in a memory are used. In the derivation of a prediction signal using spatial prediction, a boundary pixel value of coded or decoded neighboring block stored in a memory is used. The number of prediction directions in intra prediction depends on the size of the coding unit (CU). It should be noted that details of prediction will be described later.

The subtractor 105 first determines a difference (prediction error signal e) between a current block to be coded of an input image (=input signal s1) and a corresponding prediction block (=prediction signal s2). The difference is used for prediction of the current block to be coded. It should be noted that the prediction error signal e is also called a prediction residual signal.

The transformation unit 110 transforms a prediction error signal e into coefficients. Generally, the transformation unit 110 uses an orthogonal transformation such as a two-dimensional discrete cosine transformation (DCT) or an integer version thereof. The orthogonal transformation can reduce the correlation of the input signal s1 (the video signal before coding) efficiently. After the transformation, lower frequency components are usually more important for image quality than high frequency components so that more bits can be spent for coding the low frequency components than the high frequency components.

The quantization unit 120 quantizes coefficients and derives quantized coefficients.

The entropy coder 190 performs entropy coding on the quantized coefficients. The quantized coefficients are losslessly compressed by the entropy coding. Furthermore, by the entropy coding, data volume stored in the memory and data volume (bitstream) to be transmitted can be further reduced. The entropy coding is performed by mainly applying coding using variable length cordword. The length of a codeword is chosen based on the probability of its occurrence.

The entropy coder 190 transforms the two-dimensional matrix of quantized coefficients into a one-dimensional array. Typically, the entropy coder 190 performs this conversion through a so-called zigzag scanning. The zigzag scanning starts with the DC coefficient in the upper left corner of the two-dimensional array and scans the two-dimensional array in a predetermined sequence ending with an AC coefficient in the lower right corner. The energy is typically concentrated in the left upper part of the two-dimensional matrix of coefficients. Generally, when coefficients are located in the upper left corner, they are low frequency component coefficients. When coefficients are located in the lower right corner, they are high frequency component coefficients. Therefore, the zigzag scanning results in an array where usually the last values are consecutively a plurality of ones or zeros. This allows for efficient encoding using run-length codes as a part of/before the actual entropy coding.

H.264/MPEG-4 AVC and HEVC use different types of entropy coding. Although some syntax elements are coded with fixed length, most of the syntax elements are coded with variable length codes. In particular, among syntaxes, context adaptive variable length codes (CABAC) are used for coding of prediction error signals (prediction residual signals). Generally, various other integer codes different from context adaptive variable length codes are used for coding of other syntax elements. However, context adaptive binary arithmetic coding may be used.

Variable length codes allows for lossless compression of the coded bitstream. However, since the codewords have variable length, decoding must be performed sequentially on the codewords. In other words, it is not possible to code or decode codewords before encoding or decoding the previous codewords without restarting (initializing) the entropy coding or without indicating separately a position of the codeword (starting point) to start with when decoding.

Arithmetic coding codes a sequence of bits into a single codeword based on a predetermined probability model. The predetermined probability model is determined according to the content of the video sequence in case of CABAC. Arithmetic coding, and thus also CABAC, are more efficient when the length of the bitstream to be coded is larger. In other words, CABAC applied to sequences of bits is efficient for larger blocks. At the beginning of each sequence, CABAC is restarted. In other words, at the beginning of each video sequence, its probability model is initialized with some predefined or predetermined values.

The entropy coder 109 transmits, to a decoder side, a bitstream including coded quantized coefficients (coded video signals) and coded auxiliary information.

The H.264/MPEG-4 and H.264/MPEG-4 AVC as well as HEVC include two functional layers, a Video Coding Layer (VCL) and a Network Abstraction Layer (NAL). The VCL provides the coding functionality as described above. The NAL encapsulates information elements into standardized units called NAL units according to their further application such as transmission over a channel or storing in a storage device. The information elements encapsulated by the NAL are, for instance, (1) the encoded prediction error signal (compressed video data) or (2) other information necessary for the decoding of the video signal such as type of prediction, quantization parameter, motion vectors, etc. There are VCL NAL units containing the compressed video data and the related information, as well as non-VCL units encapsulating additional data such as parameter set relating to an entire video sequence, or a Supplemental Enhancement Information (SEI) providing additional information that can be used to improve the decoding performance.

Some non-VCL NAL units include, for instance, parameter sets. A parameter set is a set of parameters relating to coding and decoding of a certain portion of the video sequence. For instance, there is a sequence parameter set (SPS) which includes parameter relevant for the coding and decoding of the entire sequence of pictures. In particular, sequence parameter set is a syntax structure including syntax elements. In particular, syntax elements are applied to zero or more entire coded video sequences as determined by the content of a seq_parameter_set_id. The seq_parameter_set_id is a syntax element included in the picture parameter set (described referred below) to by the pic_parameter_set_id. The pic_parameter_set_id is syntax element included in each slice header.

The picture parameter set (PPS) is a parameter set which defines parameters applied to coding and decoding of a picture of picture sequence (video sequence). In particular, the PPS is a syntax structure including syntax elements. The syntax elements are applied to zero or more entire coded pictures as determined by the pic_parameter_set_id which is a syntax element found in each slice header.

Accordingly, it is simpler to keep track of an SPS than of the PPS. This is because PPS changes for every picture, whereas the SPS is constant for the entire video sequence which may be even minutes or hours long.

The encoder 100 includes a reconstruction unit (so called decoding unit) which derives a reconstructed signal (so called a decoded signal) s3. By the reconstruction unit, a reconstructed image obtained by reconstructing (decoding) the coded image is generated and is stored in the frame memory 170.

The reconstruction unit includes the inverse transformation unit 130, the adder 140, the deblocking filter 150, and the adaptive loop filter 160.

The inverse transformation unit 130, according to the above described coding steps, performs inverse quantization and inverse transformation. It should be noted the prediction error signal e' derived from the inverse transformation unit 130 is different from the prediction error signal e due to the quantization error, called also quantization noise.

The adder 140 derives a reconstructed signal s' by adding a reconstructed prediction error signal e' reconstructed by the inverse transformation unit 130 to a prediction signal s2.

The deblocking filter 150 performs deblocking filter processing to reduce quantization noise which superimposes the reconstructed signal s' due to quantization. Here, since the above described coding steps are performed on a per block basis, there is a case where a block boundary is visible when noise is superimposed (blocking characteristics of noise). The superimposed noise is called a blocking noise. In particular, when strong quantization is performed by the quantization unit 120, there are more visible block boundaries in the reconstructed image (decoded image). Such blocking noise has a negative effect upon human visual perception, which means that a person feels that image quality is deteriorated. In order to reduce the blocking noise, the deblocking filter 150 performs deblocking filter processing on every reconstructed signal s' (reconstructed block).

For instance, in the deblocking filter processing of H.264/MPEG-4 AVC, for each area, a filter processing suitable for the area is selected. In the case of a high degree of blocking noise, a strong (narrow-band) low pass filter is applied, whereas for a low degree of blocking noise, a weaker (broad-band) low pass filter is applied. The strength of the low pass filter is determined by the prediction signal e2 and by the prediction error signal e'. Deblocking filter processing generally smoothes the block edges. This leads to an improved subjective image quality of the decoded signals. The filtered image is used for the motion compensated prediction of the next image. Since the filter processing also reduces the prediction errors, coding efficiency can be improved.

The adaptive loop filter 160 applies sample adaptive offset (SAO) processing and/or adaptive loop filter (ALF) processing to the reconstructed image s" after the deblocking filter processing in the deblocking filter 150, to derive a reconstructed signal (decoded signal) s3.

The deblocking filter processing in the deblocking filter 150 is aimed at improving the subjective quality. Meanwhile, the ALF processing and SAO processing in the adaptive loop filter 160 are aimed at improving the pixel-wise fidelity ("objective" quality). The SAO processing is used to add an offset value to a pixel value for each pixel using a pixel value of the immediately neighboring pixel. The ALF processing is used to compensate image distortion caused by the compression. Typically, the filter used in the ALF processing is a Wiener filter with filter coefficients determined such that the mean square error (MSE) between the reconstructed signal s' and the input signal s1 is minimized. The filter coefficients of the ALF processing is calculated and transmitted on a frame-by-frame basis, for example. The ALF processing may be applied to the entire frame (image) or to local areas (blocks). Auxiliary information indicating which areas are to be filtered may be transmitted on a block-by-block basis, a frame-by-frame basis, or a quadtree-by-quadtree basis.

The frame memory (frame buffer) 170 stores part of the coded and reconstructed (decoded) image (reconstructed signal s3). The stored reconstructed image is used for decoding an inter-coded block.

The predicting unit 180 derives a prediction signal s2 using the (same) signal that can be used at both the encoder side and the decoder side, in order to maintain compatibility between the encoder side and the decoder side. The signal that can be used at both the encoder side and the decoder side is a reconstructed signal s3 (video signal after filter processing by the adaptive loop filter 160) on the encoder side that is coded and then reconstructed (decoded), and a reconstructed signal s4 (video signal after the filter processing by the adaptive loop filter in FIG. 2) on the decoder side that is decoded from a bitstream.

The predicting unit 180, when generating a prediction signal s2 by inter coding, predicts using motion compensation prediction. A motion estimator of the predicting unit 180 (not illustrated) finds a best matching block for the current block from the blocks within the previously coded and reconstructed video frames. The best matching block then becomes a prediction signal. The relative displacement (motion) between the current block and its best matching block is then signalized as motion data included in the auxiliary information in the form of three-dimensional motion vectors. The signal is transmitted along with the coded video data. The three-dimension motion vector includes two spatial dimension motion vector and one temporal dimension motion vector. In order to optimize the prediction accuracy, motion vectors may be determined with a spatial sub-pixel resolution, for example, half pixel or quarter pixel resolution. A motion vector with spatial sub-pixel resolution may point to a spatial position within an already reconstructed frame where no real pixel value is available, that is, a sub-pixel position. Hence, spatial interpolation of such pixel values is needed in order to perform motion compensated prediction. This may be achieved by an interpolation filter (integrated within predicting unit 180 in FIG. 1).

[1-3. Configuration of Image Decoding Apparatus]

A configuration of a decoder (image decoding apparatus) will be described with reference to FIG. 2.

Figure 2:
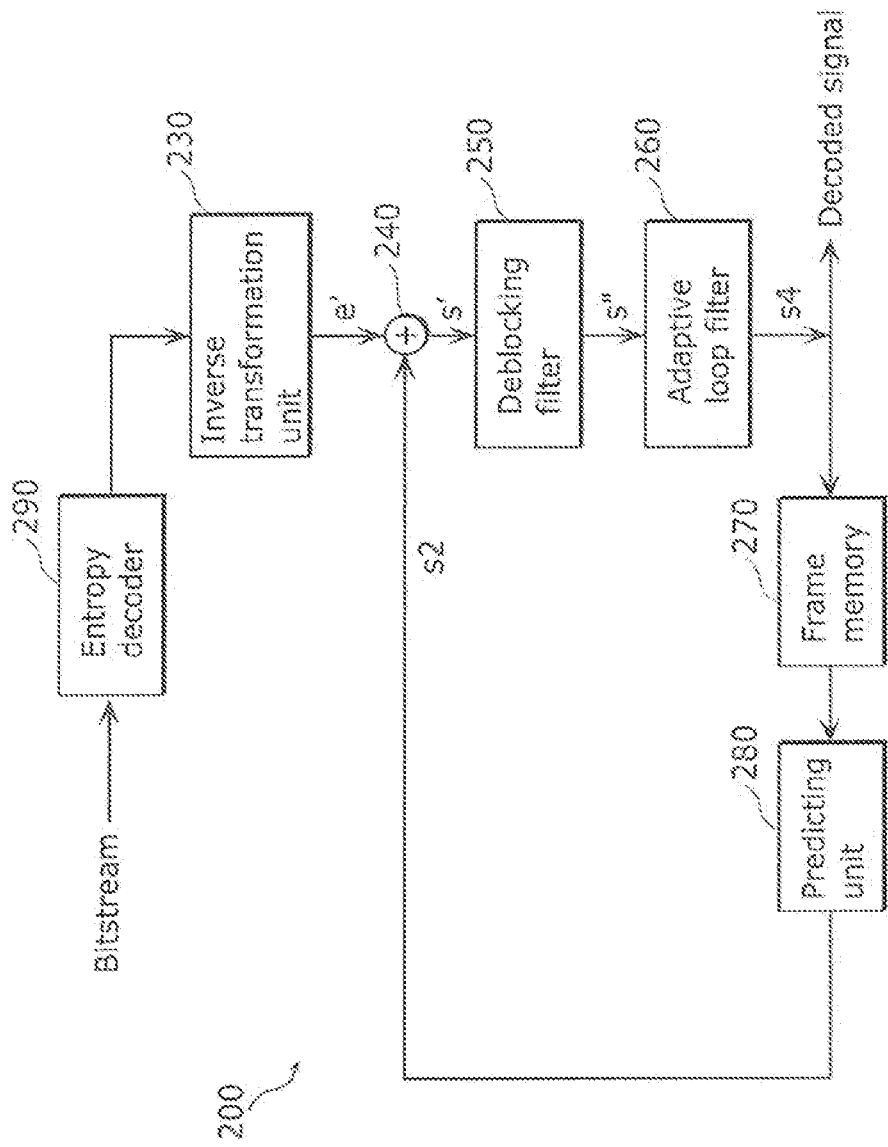
FIG. 2 is a block diagram showing an example of a decoder conforming to HEVC.

FIG. 2 is a block diagram showing an example of a decoder 200 according to the H. 264/MPEG-4 AVC or HEVC video coding standard.

As shown in FIG. 2, the decoder 200 includes an entropy decoder 290, an inverse transformation unit 230, an adder 240, a deblocking filter 250, an adaptive loop filter 260, a frame memory 270, and a predicting unit 280.

A bitstream inputted to the decoder 200 (encoded video signal) is first transmitted to the entropy decoder 290.

The entropy decoder 290 extracts the quantized coefficients coded from the bitstream and the coded auxiliary information, and decodes the coded quantized coefficients and the coded auxiliary information. The auxiliary information, as described above, information necessary for decoding such as motion data (motion vector) and mode of prediction (type of prediction).

The entropy decoder 290 transforms the decoded quantized coefficients in a one-dimensional array into those in a two-dimensional array by inverse scanning. The entropy decoder 290 inputs, to the inverse transformation unit 230, the quantized coefficients after transformed into those in a two-dimensional array.

The inverse transformation unit 230 performs inverse quantization and inverse transformation on the quantized coefficients transformed into those in a two-dimensional array, to derive a prediction error signal e'. The prediction error signal e' corresponds to the differences obtained by subtracting the prediction signal from the signal inputted to the encoder in the case no quantization noise is introduced and no error occurred.

The predicting unit 280 drives a prediction signal s2 by temporal prediction or spatial prediction. The information such as prediction type included in the auxiliary information is used in the case of intra prediction (spatial prediction). Moreover, the information such as motion data included in the auxiliary information is used in the case of motion compensated prediction (inter prediction, temporal prediction).

The adder 240 adds a prediction error signal e' obtained from the inverse transformation unit 230 and a prediction signal e2 obtained from the predicting unit 280, to derive a reconstructed signal s'.

The deblocking filter 250 performs deblocking filter processing on a reconstructed signal s'. The adaptive loop filter 260 applies the SAO processing and the ALF processing to the reconstructed signal s" to which the deblocking filter processing is applied by the deblocking filter 250. A decoded signal S4 obtained from the application of the SAO processing and the ALF processing in the adaptive loop filter 260 is stored in the frame memory 270. The decoded signal S4 stored in the frame memory 270 is used, in the predicting unit 280, for predicting the next current block to be decoded or the current image to be decoded.

[1-4. Processing Efficiency]

Generally, parallelization of processing is considered in order to enhance the processing efficiency of the coding processing and the decoding processing.

Compared with H.264/MPEG-4 AVC, HEVC has a function for supporting a high-level parallel processing (parallelization processing) of the coding and decoding. In HEVC, it is possible to divide a frame into slices, similarly to H.264/MPEG-4 AVC. Here, slices are groups of LCUs in the scan order. In H.264/MPEG-4 AVC, slices are independently decodable, and no spatial prediction is applied between the slices. Therefore, the parallel processing can be performed on a slice-by-slice basis.

However, since slices possess significantly large headers and there is the lack of dependencies between the slices, the efficiency of the compression is reduced. Moreover, CABAC coding loses efficiency when applied to small data blocks.

In order to enable a more efficient parallel processing, wavefront parallel processing (WPP) is proposed. WPP holds a constant dependency which is different from the parallel processing in which each of the slices is independent.

The following description will be made by referring to the case where a picture comprises the LCUs each in which pictures are disposed in a matrix and each LCU row comprises one slice (refer to FIG. 3). In WPP, among the LCUs comprising the current LCU row 32, as the CABAC probability model for resetting the CABAC state of the first LCU (head LCU), the CABAC probability model just after the processing on the second LCU of the previous LCU row 31 is completed is used. All inter-block dependencies are maintained. This allows for parallelization of decoding of the LCU rows. The timing for starting each LCU-row processing is delayed by two LCUs with respect to the previous one. The information about the starting points for starting the LCU row decoding are included in the slice header. The WPP is described in detail in Non Patent Literature 1.

Another approach for improving the parallelization is called tiles. Accordingly, a frame (picture) is partitioned into tiles. Tiles are rectangular groups of LCUs. The boundaries between the tiles are set such that the entire picture is partitioned in matrix. Tiles are processed in the raster scan order.

All dependencies are broken at the tile boundaries. The entropy coding such as CABAC is also reset at the beginning of each tile. Only the deblocking filter processing and the sample adaptive offset processing may be applied over the tile boundaries. Thus, tiles can be coded and decoded in parallel. Tiles are described in detail in Non Patent Literature 2 and Non Patent Literature 3.

Moreover, in order to improve the concept of slices and make it suitable for parallelization rather than for error resilience which was the original purpose of slices in H.264/MPEG-4 AVC, the concept of dependent slices and entropy slices has been proposed.

In other words, in HEVC, there are three types of slices supported: (1) normal slices; (2) entropy slices; and (3) dependent slices.

The normal slices denote slices known already from H.264/MPEG-4 AVC. No spatial prediction is allowed between the normal slices. In other words, prediction over the slice boundaries is not allowed. This means that a normal slice is coded without referring to any other slice. In order to enable independent decoding of such slices, the CABAC is restarted at the beginning of each slice.

When the slice to be processed is a normal slice, the restart of the CABAC includes end processing (terminate processing) arithmetic coding processing or arithmetic decoding processing in the precedent slice end, and processing of initializing the context table (probability table) to a default value at the beginning of the normal slice.

Normal slices are used at the beginning of each frame. In other words, every frame has to start with a normal slice. A normal slice has a header including parameters necessary for decoding the slice data.

The term "entropy slices" denotes slices in which spatial prediction is allowed between the parent slice and the entropy slice. The parsing of the parent slice and the entropy slice is independently performed.

However, the parent slice is, for instance, be a normal slice just before the entropy slice. The parent slice is required for the reconstruction of the pixel values of the entropy slice. In order to enable independent parsing of the entropy slices, the CABAC is also restarted at the beginning of the slice. As the slice header of entropy slices, it is possible to use a slice header which is shorter than the slice header of the normal slice. The slice header of the entropy slices includes a subset of coding parameters with respect to the information transmitted within the header of a normal slice. The missing elements in the header of the entropy slice are copied from the header of the parent slice.

When the slice to be processed is an entropy slice, the restart of the CABAC, as similarly to the normal slice, includes end processing (terminate processing) in the precedent slice end, and processing of initializing the context table (probability table) to a default value at the beginning of the current slice.

(3) The dependent slice is similar to an entropy slice, but is partially different in the processing in which the CABAC is restarted.

When the slice to be processed is a dependent slice and WPP is not effective, the restart of the CABAC includes end processing in the precedent slice (terminate processing) and processing of initializing the context table to a state value of the end of the precedent slice. When the slice to be processed is a dependent slice and WPP is not effective, the restart of the CABAC includes end processing in the precedent slice (terminate processing) and processing of initializing the context table to a state value after the LCU processing which belongs to the precedent slice and is the second from the left end at the beginning of the current slice.

As described above, the restart of the CABAC always includes the terminate processing. Conversely, in the restart of the CABAC, the state of the CABAC is often carried over.

The dependent slices cannot be parsed without a parent slice. Therefore, the dependent slices cannot be decoded when the parent slice is not received. The parent slice is usually a precedent slice of the dependent slices in a coding order, and a slice which includes a complete slice header. This is the same for the parent slice of the entropy slice.

As described above, dependent an entropy slices use the slice header (in particular, the information of the slice header which is missing in the dependent slice's header) of the immediately preceding slice according to the coding order of the slices. This rule is applied recursively. The parent slice the current dependent slice depends on is recognized as available for reference. Reference includes use of spatial prediction between the slices, sharing CABAC states, and the like. A dependent slice uses the CABAC context tables that are generated at the end of the immediately preceding slice. Thus, a dependent slice does not initialize the CABAC tables to the default values, but, instead keeps on using the already developed context tables. Further details regarding the entropy and dependent slices can be found in Non Patent Literature 3.

The HEVC provides several profiles. A profile includes some settings of the image coding apparatus and the image decoding apparatus suitable for a particular application. For instance, the "main profile" only includes normal and dependent slices, but not entropy slices.

As described above, the coded slices are further encapsulated into NAL units, which are further encapsulated, for instance, into a Real Time Protocol (RTP) and finally into Internet Protocol (IP) packets. Either this, or other protocol stacks, enables transmitting of the coded video in packet-oriented networks, such as Internet or some proprietary networks.

Networks typically include at least one or more routers, which employ special hardware operating very fast. The function of the router is to receive IP packets, to analyze their IP packet headers and, accordingly, to forward the IP packets to their respective destinations. Since the routers need to handle traffic from many sources, the packet handling logic needs to be as simple as possible. The minimum requirement for the router is checking the destination address field in the IP header in order to determine which route to take for forwarding them. In order to further provide support for quality of service (QOS), smart (media-aware) routers additionally check specialized fields in the network protocol headers, such as IP header, RTP header, and even the header of a NALU.

As can be seen from the above description of the video coding, the different types of slices defined for the purpose of parallel processing, such as dependent slices and entropy slices, are of different importance with respect to the quality distortion upon their damage. In particular, the dependent slices cannot be parsed and decoded without a parent slice. This is because at their beginning of the dependent slice, the entropy coder or decoder cannot be restarted. Accordingly, the parent slice is more important for the reconstructing of the image or video.

In HEVC, the dependent and entropy slices introduce an additional dimension of dependency, namely, the inter-slice dependency (a dependency within the frame). This kind of dependency is not considered by the routers.

The above described dependencies and, in particular, the inter-slice dependency is not considered at the network level. However, it would be desirable to take the above described dependency into account at the network level in order to provide a better support for quality of service. Accordingly, it is necessary to improve the flexibility of packet handling at the network level by considering the dependencies of the slices.

Details of Problem

[1-5. WPP and Dependent Slice]

The dependent slices can be used together with parallel processing tools such as waveform parallel processing (WPP) and tiles. In particular, dependent slices make wavefront (substream) capable of decreasing the transmission delay without causing a coding loss.

Moreover, dependent slices serve as starting points for CABAC substreams since the CABAC is not restarted at the dependent slices. Moreover, the information indicating the starting points may be transmitted in the bitstream in order to provide the starting points for possibly independent parsing. In particular, if more than two CABAC substreams are encapsulated in a normal or dependent slice, starting points are signaled explicitly in the form of the number of bytes per substream. Here, the substream denotes a portion of the stream which is parseable independently thanks to the starting points. Additionally, dependent slices can be used as starting point "markers", since every dependent slice needs to have a NAL unit header. This means that the starting points can be signaled with respect to such markers.

The two approaches, namely the explicit starting point signaling and the marking of the starting points via dependent slices are used jointly.

As a rule, the starting point of every NAL unit (beginning of every NAL header) has to be identifiable. There is no requirement about the exact identification operation. For example, the following two methods may be applied.

The first method is a method of putting a start code (for instance, 3 bytes long) at the beginning of each NAL header. The second method is a method of putting every NAL unit in a separate packet. Due to the dependency of the slices, the slice header size may be reduced.

Regarding entropy slices, the method enable parallel CABAC parsing. This is because CABAC is truly restarted at the beginning of the entropy slices. In the case of parallel processing of CABAC, CABAC represents a bottleneck which can be overcome by parallel CABAC parsing followed by sequential pixel reconstruction operations. In particular, the WPP parallelization tool enables decoding of each LCU row by one processing core (intellectual property code (IP core), a function block). It should be noted that the assignment of the LCU rows to the cores may be different. For instance, two rows may be assigned to one core, and one row may be assigned to two cores.

Figure 3:
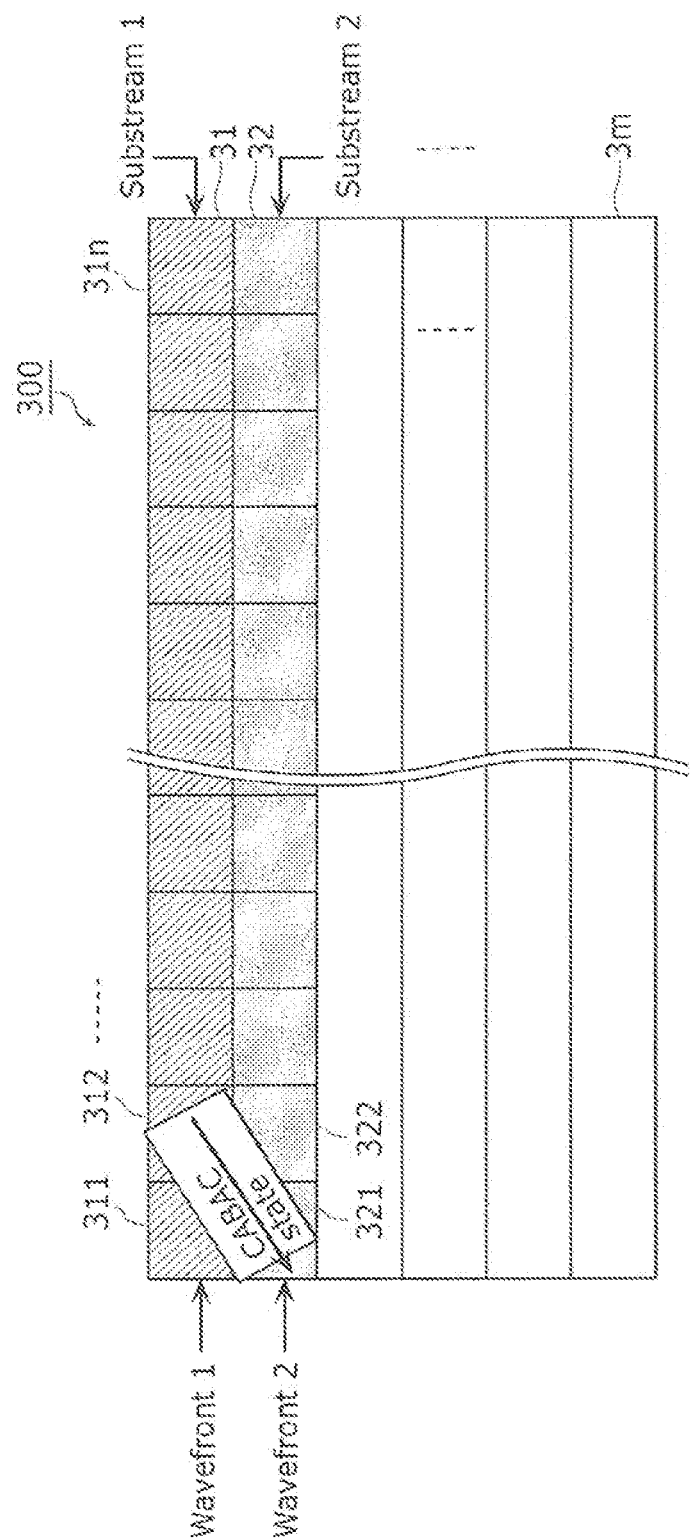
FIG. 3 is a diagram showing an example of a configuration of an image in the wavefront parallel processing (WPP).

FIG. 3 is a diagram showing an example of a configuration of a picture 300. In FIG. 3, a picture 300 is subdivided into 31 to 3m (m is the ordinal number of LCU) rows of largest coding units (LCU). Each of the LCU rows 3i (I=1 to m) comprises LCUs 3i1 to 3in (n is the ordinal number of LCU column) that are disposed in a row. The LCU row 3i corresponds to "Wavefront i". Parallel processing can be performed for wavefronts. The arrow of the CABAC state in FIG. 3 denotes a relationship between LCU referring to the CABAC state and the reference destination.

Specifically, in FIG. 3, first, among the LCUs included in the LCU row 31, the processing (coding or decoding) starts for the head LCU 311. The processing on the LCUs is performed in an order from the LCU 311 to 31n. After the processing on the first two LCUs 311 and 312 in the LCU row 31 is performed, the processing on the LCU row 32 is started. In the processing of the first LCU row 321 of the LCU column 32, as shown in the arrow of the CABAC state in FIG. 3, the CABAC state just after the processing on the LCU 312 in the LCU row 31 in the first row is used as the initial state of the CABAC state. In other words, there is a delay of two LCUs between the two parallel processings.

Figure 4:
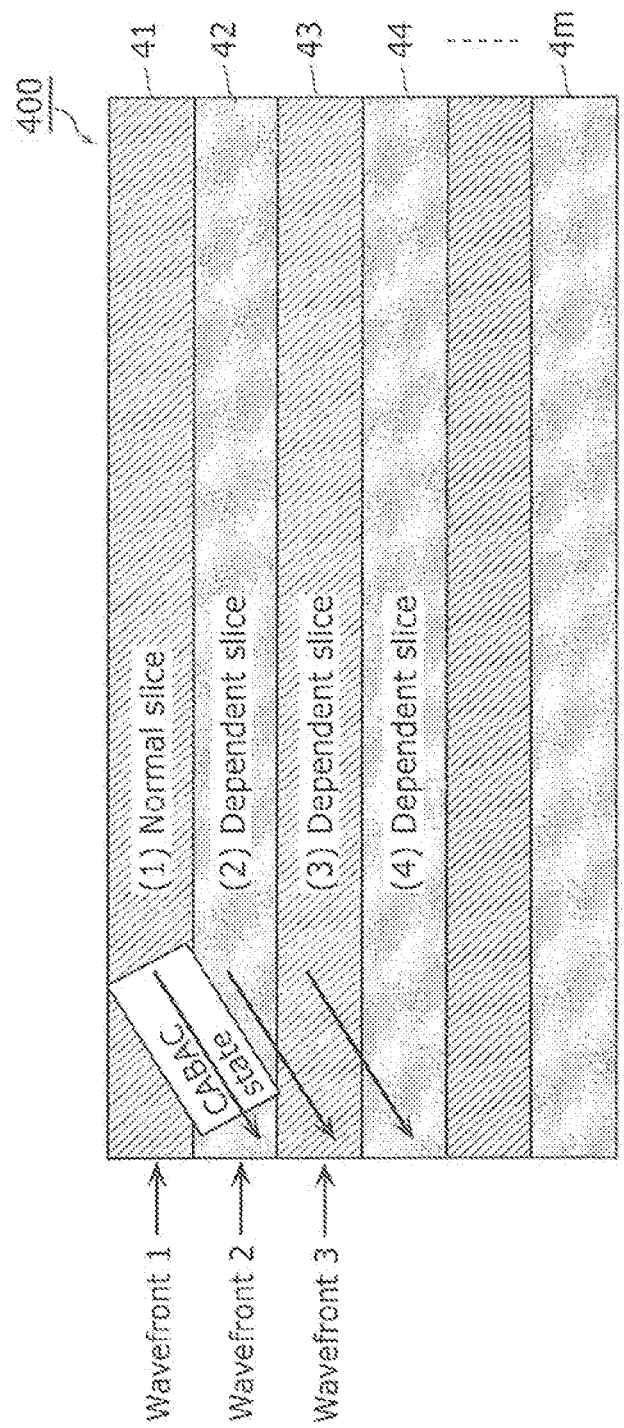
FIG. 4 is a diagram showing an example of a relationship between a normal slice and a dependent slice in the wavefront parallel processing.

FIG. 4 is a diagram showing an example of the case where a dependent slice using WPP is used. The LCU rows 41 to 43 correspond to "Wavefront 1", "Wavefront 2" and Wavefront 3", respectively. The LCU rows 41 to 43 are processed by their respective independent cores. In FIG. 4, the LCU row 41 is a normal slice, and the LCU rows 42 to 4m are dependent slices.

The dependent slices make WPP capable of reducing the delay. The dependent slices have no complete slice header. Moreover, the dependent slices can be decoded independently of the other slices as long as the starting points (or the starting point of dependent slices, which is known as a rule as described above) are known. In particular, the dependent slices can make WPP suitable also for the low-delay applications without incurring a coding loss.

In the usual case of encapsulating the substreams (LCU rows) into slices, it is mandatory to insert the explicit starting points into the slice header for ensuring the parallel entropy coding and decoding. As a result a slice is ready for transmission only after the last substream of the slice is encoded completely. The slice header is completed only after the coding of all of the substreams in the slice is completed. This means that the transmitting of the beginning of a slice cannot be started via packet fragmentation in the RTP/IP layer until the whole slice is finished.

However since the dependent slices can be used as starting point markers, explicit starting point signaling is not required. Therefore, it is possible to split a normal slice into many dependent slices without coding loss. Dependent slices can be transmitted as soon as the encoding of the encapsulated sub-stream is completed (or even earlier in the case of packet fragmentation).

The dependent slices do not break the spatial prediction dependency. The dependent slices do not even break the parsing dependency. This is because ordinarily the parsing of the current dependent slice requires the CABAC states from the previous slice.

When dependent slices were not allowed, then each LCU row can be configured to be a slice. Such a configuration lowers the transmission delay, but at the same time, leads to a rather high coding loss as discussed in the Background section above.

Alternatively, the entire frame (picture) is encapsulated into a single slice. In this case, the starting points for the substreams (LCU rows) needs to be signaled in the slice header in order to enable their parallel parsing. As a result, there is a transmission delay at the frame level. In other words, the header needs to be modified after the entire frame is coded. Having an entire picture encapsulated in a single slice by itself does not increase the transmission delay. For example, the transmission of some parts of the slice may start already before the whole coding is finished. However, if WPP is used, then slice header needs to be modified later in order to write the starting points. Therefore, the entire slice needs to be delayed for transmission.

The use of dependent slices thus enables a reduction of the delay. As shown in FIG. 4, a picture 400 is divided into a LCU row 41 that is a normal slice, and the LCU rows 42 to 4m that are dependent slices. When each LCU row is one dependent slice, a transmission delay of one LCU row can be achieved without any coding loss. This is caused by the fact that the dependent slices do not break any spatial dependency and do not restart the CABAC engine.

[1-6. Configuration of Packet]

As described above, the network routers have to analyze headers of packets in order to enable the providing of quality of service. The quality of service is different according to the type of application and/or priority of the service and/or of the relevance of the packet for the distortion caused by its packet loss.

Figure 5:
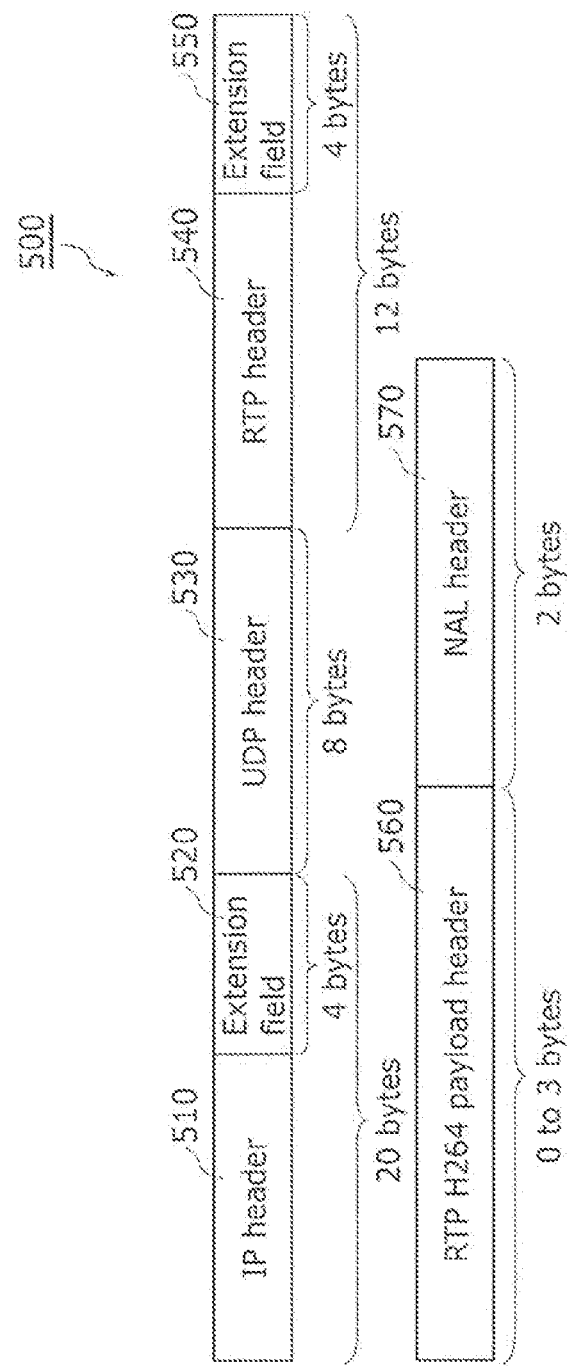
FIG. 5 is a diagram showing an example of a packet header.

FIG. 5 is a diagram showing an example of an encapsulation (packetization) of a bitstream.

Generally, real time protocol (RTP) is used for packetization. The RTP is usually used for real time media transmission. The header lengths of the respective involved protocols are basically fixed. The protocol headers have extension fields. The extension fields can extend the length of the headers by 4 bytes. For example, the IP header can be extended by up to 20 bytes. The syntax elements in the headers of IP, User Datagram Protocol (UDP) and RTP are also fixed in their length.

FIG. 5 shows a packet header 500 included in an IP packet. The packet header shown in FIG. 5 includes an IP header 510, a UDP header 530, a RTP header 540, a RTP H264 payload header 560, and a NAL header 570. The IP header 510 is a header with a length of 20 bytes with an extension field 520 of 4 bytes. The payload of the IP packet is a UDP packet. The UDP packet includes a UDP header 530 with a length of 8 bytes and the UDP payload. The UDP payload is formed by the RTP packet. The RTP packet includes a RTP header 540 with a length of head 12 bytes and an extension field 550 of 4 bytes. The RTP packet can be selectively extended by the extension field. The payload of the RTP packet includes a special RTP H264 payload header 560 with a length of 0 to 3 bytes followed by a NAL header 570 of the HEVC which is 2 bytes in length. The payload of the NALU including the coded video packet follows the packet headers 500 (not shown in FIG. 5).

The routers which are capable of providing an enhanced quality of service are called Media Aware Network Elements (MANE). The Media Aware Network Elements check some of the fields of the packet headers shown in FIG. 5. For example, MANE is called "temporal_id" and included in the NAL header 570 or the decoding order number included in the RTP header 540 may be checked in order to detect losses and presentation order of the received packet contents. The routers (network elements) handle the packets as fast as possible in order to enable a high throughput in the network. The logic is required to access the fields in the packet headers rapidly and simply, in order to keep the complexity of the network element processing low.

The NALU is encapsulated by the header 500. The NALU may include slice data when a slice header is present.

FIG. 6 is a diagram showing an example of a slice header syntax 600. The syntax element dependent_slice_flag 601 is a syntax element indicating whether or not whether a slice is a dependent slice. This syntax element can be used to identify the inter-slice dependency. However, the slice header is the content of a NALU. Parsing of the syntax elements before the dependent_slice_flag 601 requires a rather complicated logic. This is a level which cannot be efficiently considered by ordinary routers as will be shown below.

As described above, a NALU includes information common for a plurality of slices such as parameter sets, or includes directly coded slices with information necessary for decoding included in the slice header. Syntax of a slice header used for an entropy or a dependent slice is exemplified in FIG. 6. FIG. 6 shows a table with a slice header structure. When the syntax element "dependent_slice_flag" is set to 1, all of the slices up to the first normal slice (a slice which is not an entropy slice and not a dependent slice) preceding the current slice in the decoding order are required. When the slices are not decoded, in general, the current dependent slice cannot be decoded. In some special cases, for example, the dependent slice can be decodable when some other side information signaled or derived is available. The syntax element dependent_slice_flag 601 is included approximately in the middle of the slice header. Moreover, the slice header includes the number of CABAC substreams within the current slice signaled by the information element num_entry_points_offsets 602 and the number of bytes in a substream 603 signaled by the syntax element entry_points_offsets [i]. Here, the information element num_entry_points_offsets 602 corresponds to the number of entry points. Furthermore, i is an integer and an index denoting the particular entry points (offsets of the entry points). The number of bytes in a substream denoted by entry_point_offset [i] 603 enables an easy navigation within the bitstream.

[1-7. Dependency of Picture]

As described above, there are several types of dependencies resulting from the HEVC coding approach.

Figure 7:
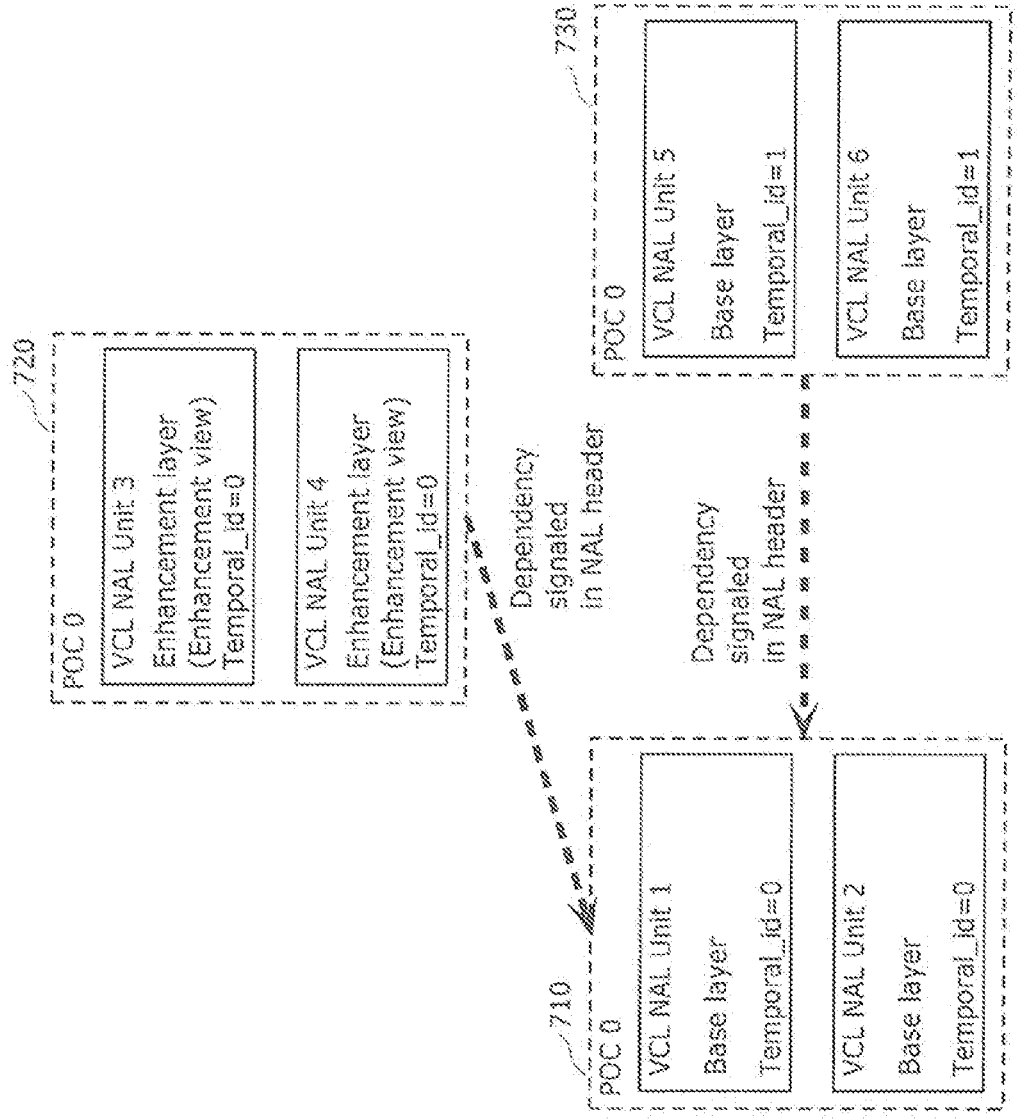
FIG. 7 is a diagram showing dependencies and signal transmission when a normal slice is used.

FIG. 7 is a diagram showing the dependencies and their signaling in the case in which only normal slices, that is, no dependent and no entropy slices, are used. FIG. 7 shows three pictures 710, 720, and 730.

The picture 710 is a base layer picture carried in two VCL NALUs, namely VCL NAL Unit 1 and VCL NAL Unit 2. POC indicates the order in which the pictures are to be rendered. VCL NALU includes a syntax element indicating whether a picture belongs to a base layer or to an enhancement layer, and a syntax element temporal_id. The syntax element indicating whether a picture belongs to a base layer or to an enhancement layer is transmitted under a state of being within the NAL header 570 of the packet header 500 shown in FIG. 5. The syntax element "temporal_id" is also transmitted under a state of being within the NAL header 570. The syntax element "temporal_id" indicates the degree of dependency of the other pictures. For instance, pictures or slices coded with temporal_id=0 are decodable independently of other pictures/slices which have a higher temporal_id. It should be noted that in HEVC, temporal_id is signaled in the NAL header as nuh_temporal_id_plus1 (refer to FIG. 9A). In particular, the following Expression 1 can be applied to the relationship between the temporal_id used in these examples and the syntax element nuh_temporal_id_plus1.

[Math. 1]

$$\text{temporal\_id} = \text{nuh\_temporal\_id\_plus1} - 1 \qquad \text{(Expression 1)}$$

Slices with temporal_id=1 depend on slices of temporal_id with a lower value. In other words, the value of temporal_id in this case is 0. In particular, the temporal_id syntax element refers to the prediction structure of the picture. In general, slices with a particular value of temporal_id depend only on slices with a lower or equal value of temporal_id.

Accordingly, a picture 710 in FIG. 7 can be decoded first.

A picture 720 is an enhancement layer to the base layer of the picture 710. Thus, there is a dependency which requires picture 720 to be decoded after decoding picture 710. The picture 720 includes two NALUs, namely VCL NAL Unit 3 and VCL NAL Unit 4. Both pictures 710 and 720 have their POC value of 0. This means that the pictures 710 and 720 belong to the same image to be displayed at once. The images comprise the base and the enhancement layer.

The picture 730 is a base layer which includes two NALUs, namely VCL NAL Unit 5 and VCL NAL Unit 6. The picture 730 has the POC value of 1. This means that picture (portion) 730 is to be displayed after the pictures 720 and 710. Moreover, the picture 730 has the value of temporal_id=1. This means that the picture 730 temporally depends on a picture with temporal_id=0. Accordingly, based on the dependency signaled in the NAL header, the picture 730 depends on the picture 710.

Figure 8:
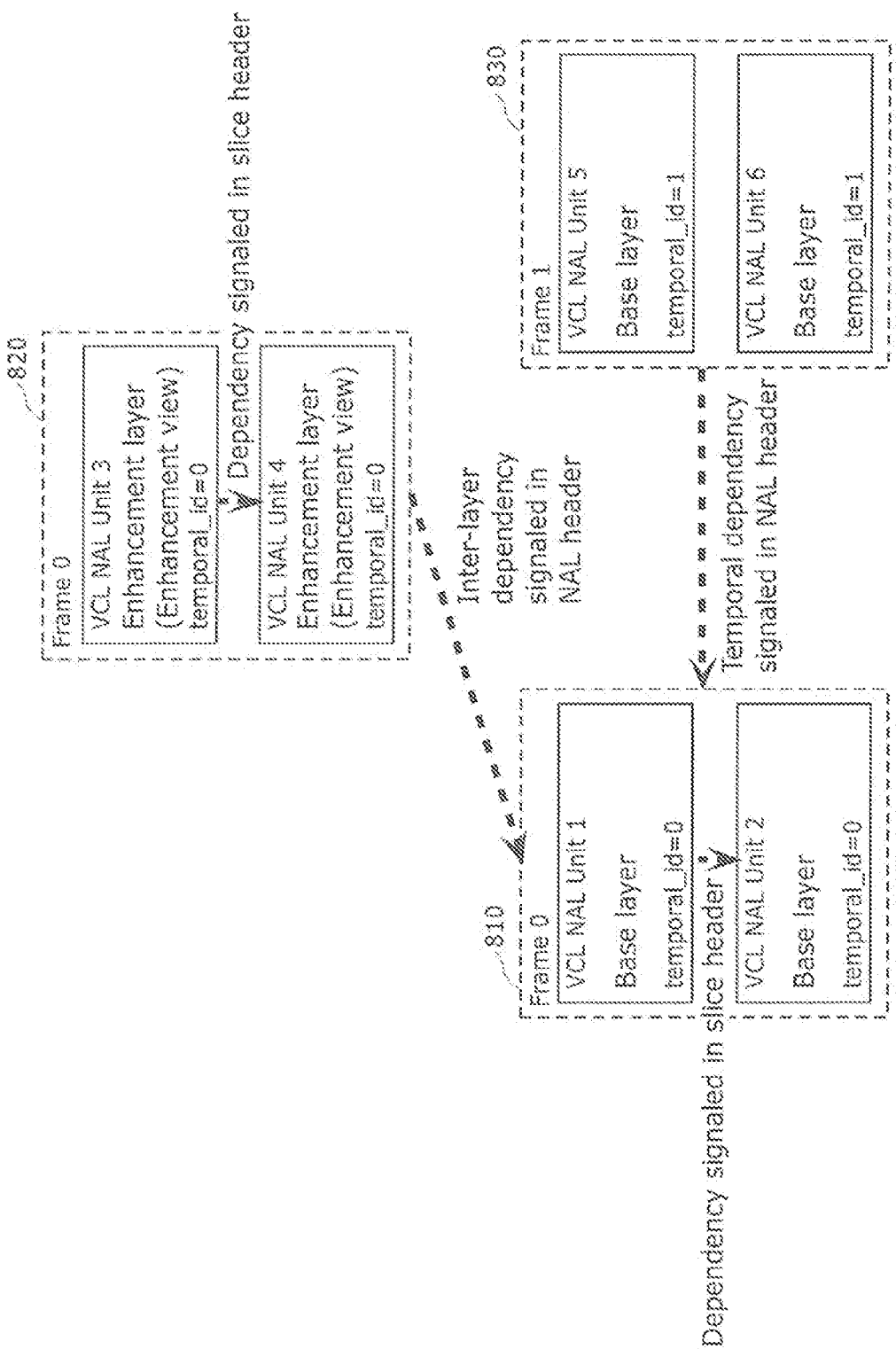
FIG. 8 is a schematic view showing dependencies and signal transmissions when a dependent slice and an entropy slice are used.

FIG. 8 is a diagram showing the dependencies (degree of dependency) and their signaling in the case in which dependent and no entropy slices are used. FIG. 8 shows three pictures 810, 820, and 830. FIG. 8 differs from FIG. 7 described above in that dependencies of the dependent and entropy slices signaled within the slice header are added.

In FIG. 7, the inter-layer dependency is shown with the example of the pictures 710 and 720. Moreover, the temporal dependency is shown in the example of the pictures 710 and 730. These dependencies are both signaled in the NAL header.

The inter-slice dependency as shown in FIG. 8 is inherent to dependent and entropy slices. In particular, the base layer frame 810 and the enhancement layer frame 820 both have two slices. Of the two slices, one is a parent slice (normal slice) and the other is (dependent slice). In frame 810, VCL NAL Unit 1 slice is the parent slice of the VCL NAL Unit 2. In frame 820, VCL NAL Unit 3 slice is the parent slice of the VCL NAL Unit 4. As described above, the term "parent slice" of a dependent slice refers to a slice from which the dependent slice depends, that is, the slice of which the slice header information is used by the dependent slice. This is as a rule that the first preceding slice is a slice that has a complete header. The slice that has a complete header is a normal slice, not another dependent slice, for example.

The corresponding syntax of the NAL unit header and the slice header as currently used in the HEVC and in particular in HM8.0 will be described with reference to FIG. 9A.

FIG. 9A is a diagram showing the syntax of a NAL unit header 910 and the syntax of the slice header 920. In particular, the inter-layer dependencies are planned (in the current standardization) to be signaled within the NAL unit header using the syntax element nuh_reserved_zero_6 bits. The temporal dependencies are signaled using the syntax element nuh_temporal_id_plus1. The slice header 920 includes a signal indicating the inter-slice dependency indicator. The inter-slice dependency indicator is indicated by the syntax element dependent_slice_flag. In other words, the inter-slice dependency (for example, temporal dependency) is signaled within the slice header, somewhere in the slice header.

In order to parse this syntax element, all the syntax elements preceding dependent_slice_flag must be parsed as well as the parameter set syntax elements necessary for parsing the slice header syntax elements preceding the dependent_slice_flag.

[1-8. Processing in Router]

As described above, in traffic shaping determination, it is desirable to take the dependencies introduced by the dependent and entropy slices into account, in addition to the dependencies signaled in the NAL header. For instance, a router may be implemented as a media aware mobile base station. The bandwidth in the downlink is very limited and needs to be managed very carefully. Let us assume the following example case. Assume that a packet is randomly dropped in the upstream by a normal router. In this case, a media aware network element (MAME) discovers the packet loss by checking the packet number. After checking the packet loss, MANE drops all the packets which are dependent on the dropped packet and which follow. This is a feature desirable for media aware network elements. In this way, packets can be dropped more intelligently. When a router is determined to drop a NAL unit, it would immediately deduce that the following dependent slices need to be dropped as well. In the current syntax introduced in FIG. 9A, the accessing of the dependent_slice_flag requires parsing of a considerable amount of information. This is not essential for the packet routing or traffic shaping operations in the routers. All of the information that is necessary for discovering the inter-layer and inter-temporal relations are present in the video parameter set. The video parameter set is the highest set in the parameter set hierarchy.

Accordingly, the above described information is signaled within the NAL header 570. However, in the case of the NAL header and the slice header shown in FIG. 9A, accessing slice dependency information requires keeping track of additional parameter sets such as PPS and SPS. This, on the other hand, reuses the capability of media-aware gateways or routers. As seen from FIG. 9A, the slice header 920 has to be parsed up to the dependent_slice_flag and the parsed parameters are useless for network operation.

In order to be able to parse the slice address which precedes the dependent_slice_flag, the following syntax elements are required from the syntax elements included in the SPS930 as shown in FIG. 9B. FIG. 9B is a diagram showing an example of syntax included in SPS.

pic_width_in_luma_samples (reference sign 931 in FIG. 9B)

pic_height_in_luma_samples (reference sign 932 in FIG. 9B)

log_2_min_coding_block_size_minus 3 (reference sign 933 in FIG. 9B)

log_2_diff_max_min_coding_block_size (reference sign 934 in FIG. 9B)

These parameters are shown in the right table of FIG. 9B and are necessary to obtain the slice_address parameter. The syntax element slice_adress is variable length coded (as can be seen when looking at the length "v" in the descriptor, second column, of slice_address and slice header 920 in FIG. 9A). In order to know the length of this variable length coded parameter, those syntax elements from SPS are needed. In fact, in order to be able to parse the dependent_slice_flag, the actual value of the slice_address syntax element is not necessary. Only the length of the syntax element which is variable must be known so that the parsing process may continue.

Therefore, the SPS needs to be parsed up to the point 935 from the syntax elements within SPS 930 shown in FIG. 9B. The four syntax elements are required to be stored. They are later used in a formula for calculating the length of the slice_address syntax element.

Figure 9C:
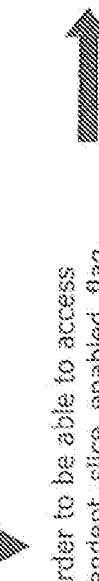
FIG. 9C is a diagram for explaining parsing steps to be performed for parsing the inter-layer dependencies in HM8.0.

Moreover, in order to access the dependent_slice_enabled_flag also preceding the dependent_slice_flag, the PPS needs to be parsed up to the point 945 from the syntax elements within PPS shown in FIG. 9C. FIG. 9C is a diagram showing an example of syntax included in PPS. It should be noted that the syntax elements whose parsing methods are described with reference to FIGS. 9A to 9C and which are located within the slice header and the SPS and the PPS are not required for common router operations. Moreover, some of the syntax elements cannot simply be skipped since some of the syntax elements are coded with variable length codes. Accordingly, even if jumping is performed in the bit stream by a predefined amount of bits, jumping until the dependent_slice_enabled_flag is not possible.

In other words, in order to read the dependent_slice_flag (dependency indication), the MANE needs to go further in the slicing header (refer to slice header 920) whose parsing is rather complicated.

Specifically, the flag first_slice_in_pic_flag has to be parsed. The flag first_slice_in_pic_flag is a flag indicating whether or not a slice is the first slice within the picture.

Then, no_output_of_prior_pics_flag whose presence is conditional on the NALU type has to be parsed.

Moreover, the variable length coded pic_parameter_set_id has to be decoded. The syntax element pic_parameter_set_id is a syntax element indicating which of the parameter sets is used (a syntax element which identifies the parameter set). By parsing pic_parameter_set_id, the parameter set to be used can be identified.

Finally, the slice_address syntax element is required. The syntax element slice_address is a syntax element indicating the starting position of the slice. The syntax element further requires parsing the PPS and SPS as well as additional computation.

As the last step, the value of dependent_slice_enabled_flag (dependent slice enabled flag) has to be obtained from the PPS, in order to know whether the dependent_slice_flag is present in the bitstream or not. When dependent_slice_enabled_flag=0, it means that the current slice is a normal slice since the dependent slices are not enabled. In order to obtain the value of dependent_slice_enabled_flag, the PPS is required to be parsed up to approximately its middle.

Unfortunately, the syntax elements before dependent_slice_flag cannot be skipped and need to be parsed unlike the case of RTP and NAL header data, in which the position of the data is predefined. This is caused by the fact that the syntax elements in the slice header are variable length coded. Therefore, the presence and length of the element needs to be computed for every VCL NAL unit. In addition, the additional session data needs to be stored because they are needed later (refer to PPS and SPS). Moreover, presence of some syntax elements depends on presence or value of other syntax elements included possibly in other parameter structures (the syntax elements are conditionally coded).

In the current standardization, there is a proposal to signal the dependency structure of the video sequence in the Video Parameter Set (VPS) that describes how many layers are contained in the bit stream and the dependency indicators to indicate the various inter-layer dependencies. The VPS is signaled in the very beginning of the video, before the first SPS. Multiple SPSs can refer to a single VPS. This means that a VPS carries information that is valid for multiple video sequences. The main goal of the VPS is to inform a router or decoder about the content of the video including information. How many video sequences are included and how are they interrelated. SPS is valid only within a video sequence whereas VPS carries information related to multiple video sequences.

Moreover, the characteristic of the information carried in the VPS is informative especially for routers. For example, the VPS might carry information that is required for streaming session setup since the design is not finalized. The router parses the information in the VPS. The router, without the need to other parameter sets (by just looking at the NAL headers), can determine which data packets to forward to the decoder and which packets to drop.

However, in order to discover the currently active VPS, the following ordered steps need to be performed:
parsing the PPS_id in the slice header;
parsing the SPS_id in the active PPS determined by the PPS_id; and
parsing the VPS_id in the active SPS determined by the SPS_id.

In order to solve the above described problem, an image coding method according to an aspect of the present disclosure is an image coding method of performing coding processing by partitioning a picture into a plurality of slices, the image coding method comprising transmitting a bitstream which includes: a dependent slice enabling flag indicating whether or not the picture includes a dependent slice on which the coding processing is performed depending on a result of the coding processing on a slice different from a current slice; a slice address indicating a starting position of the current slice; and a dependency indication (dependent_slice_flag) indicating whether or not the current slice is the dependent slice, wherein the dependent slice enabling flag is disposed in a parameter set common to the slices, the slice address is disposed in a slice header of the current slice, and the dependency indication is disposed in the slice header, and is disposed before the slice address and after a syntax element (pic_parameter_set_id) identifying the parameter set.

In the above described image coding method, a dependency indication of inter-slice dependency is located in a position suitable for parsing by the router. With this, it is possible to code the dependency indication the syntax independently, in other words, unconditionally, from other syntax elements.

For example, the dependency indication may be included in the bitstream when the dependent slice enabling flag indicates inclusion of the dependent slice.

For example, the dependent slice enabling flag may be disposed at a beginning of the parameter set.

For example, each of the slices may include a plurality of macroblocks, and the coding processing on the current slice may be started after the coding processing is performed on two of the macroblocks included in an immediately preceding current slice.

For example, the dependency indication may not be included in a slice header of a slice which is processed first for the picture, among the slices.

In order to solve the above described problem, an image decoding method according to an aspect of the present disclosure is an image decoding method of performing decoding processing by partitioning a picture into a plurality of slices, the image decoding method comprising extracting, from a coded bitstream, a dependent slice enabling flag indicating whether or not the picture includes a dependent slice on which the decoding processing is performed depending on a result of the decoding processing on a slice different from a current slice, a slice address indicating a starting position of the current slice, and a dependency indication indicating whether or not the current slice is the dependent slice, wherein the dependent slice enabling flag is disposed in a parameter set common to the slices, the slice address is disposed in a slice header of the current slice, and the dependency indication is disposed in the slice header, and is disposed before the slice address and after a syntax element identifying the parameter set.

For example, the dependency indication may be extracted from the bitstream when the dependent slice enabling flag indicates inclusion of the dependent slice.

For example, the dependent slice enabling flag may be disposed at a beginning of the parameter set.

For example, each of the slices may include a plurality of macroblocks, and the decoding processing on the current slice may be started after the decoding processing is performed on two of the macroblocks included in an immediately preceding current slice.

For example, the dependency indication may not be included in a slice header of a slice which is processed first for the picture, among the slices.

In order to solve the problem, an image coding apparatus according to an aspect of the present disclosure is an image coding apparatus which performs coding processing by partitioning a picture into a plurality of slices, the image coding apparatus comprising a coder which transmits a bitstream which includes: a dependent slice enabling flag indicating whether or not the picture includes a dependent slice on which the coding processing is performed depending on a result of the coding processing on a slice different from a current slice; a slice address indicating a starting position of the current slice; and a dependency indication indicating whether or not the current slice is the dependent slice, wherein the dependent slice enabling flag is disposed in a parameter set common to the slices, the slice address is disposed in a slice header of the current slice, and the dependency indication is disposed in the slice header, and is disposed before the slice address and after a syntax element identifying the parameter set.

In order to solve the problem, an image deciding apparatus according to an aspect of the present disclosure is an image decoding apparatus which performs decoding processing by partitioning a picture into a plurality of slices, the image decoding apparatus comprising a decoder which extracts, from a coded bitstream, a dependent slice enabling flag indicating whether or not the picture includes a dependent slice on which the decoding processing is performed depending on a result of the decoding processing on a slice different from a current slice, a slice address indicating a starting position of the current slice, and a dependency indication indicating whether or not the current slice is the dependent slice, wherein the dependent slice enabling flag is disposed in a parameter set common to the slices, the slice address is disposed in a slice header of the current slice, and the dependency indication is disposed in the slice header, and is disposed before the slice address and after a syntax element identifying the parameter set.

In order to solve the above described problem, an image coding and decoding apparatus according to an aspect of the pre sent disclosure includes the above described image coding apparatus and the above described image decoding apparatus.

According to the image coding method, the image decoding method, and the like that are configured above, an indication of inter-slice dependency is located within the syntax of the bitstream related to a slice independently from other elements. The dependency indication is located, without unnecessarily parsing other elements, separately from the other elements. In the above HEVC examples, the indicator of the inter-slice dependency dependent_slice_flag is signaled at a location in which it is not necessary to parse syntax elements irrelevant for the network operation.

Specifically, the present disclosure provides an apparatus for parsing a bitstream of a video sequence of images encoded at least partially with a variable length code and including data units carrying coded slices of video sequence. The apparatus comprises a parser for extracting from the bitstream a dependency indication which is a syntax element indicating for a slice whether or not the variable length decoding or parsing of the slice depends on other slices, wherein the dependency indication is extracted from the bitstream independently of and without need for extracting other syntax elements beforehand.

Such apparatus may be included, for instance, within the entropy decoder 290 in FIG. 2. When referring to the extracting from the bitstream, the extraction and, where necessary for the extraction, an entropy decoding is meant. The entropy coding is a variable length coding, for instance, the arithmetic coding such as CABAC. This is, in HEVC, applied to coding of the image data. Data units here refer, for instance, to NAL units or access units. The expression "without need for extracting other syntax elements" refers to a situation in which the dependency indication is preceded only by elements, of which the length is known and of which the presence is known or conditioned on elements already parsed or not conditionally coded at all.

The present disclosure further provides an apparatus for generating a bitstream of a video sequence encoded at least partially with a variable length code and including data units carrying coded slices of video images The apparatus comprises a bitstream generator for embedding into the bitstream a dependency indicator which is a syntax element indicating for a slice whether or not the variable length decoding of the slice depends on other slices, wherein the dependency indicator is embedded into the bitstream independently of and without need for embedding other syntax elements beforehand.

Such apparatus may be included, for instance, within the entropy decoder 190 in FIG. 1.

According to the image coding method, the image decoding method, and the like that are configured above, the bitstream includes coded slice data and header data regarding the slice, and the dependency indicator is located within the bitstream at the beginning of the slice header. This means that the slice header begins with the syntax elements indicating the slice dependency.

It should be noted that the dependency indication does not have to be located at the very beginning of the slice header. However, it is advantageous when no other conditionally coded and/or no variable length coded syntax element precedes the dependency indicator within the slice header.

For instance, the current position of the dependent_slice_flag is changed with respect to the prior art described above so as to be located at the beginning of the slice header. With this change, the reduction of the amount of syntax elements that need to be parsed is achieved. Complicated parsing operations of the routers are avoided, such as variable length decoding and parsing of information that requires additional computations and/or storing of additional parameters for future use and/or parsing of other parameter sets. Moreover, the number of parameter sets that are required to be tracked is reduced.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are specifically described with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following embodiments, structural elements not recited in any one of the independent claims are described as arbitrary structural elements.

Embodiment 1

Figure 10:
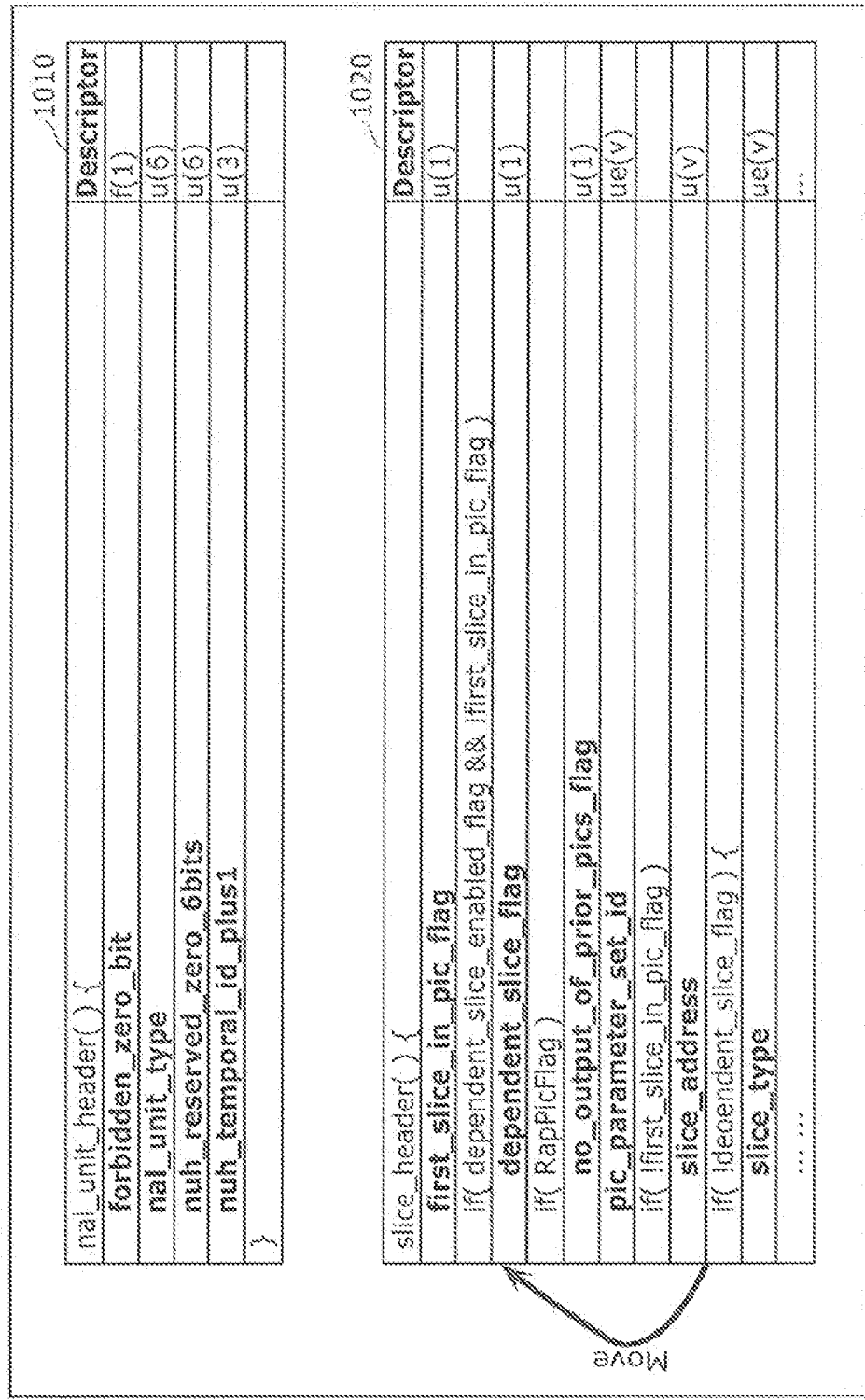
FIG. 10 is a diagram showing an example of the position of the dependent_slice_flag.

FIG. 10 shows an example of bitstream syntax according to the present embodiment. A NAL header 1010 shown in FIG. 10 is the same as the NAL header 910 shown in FIG. 9A. In other words, there is no change.

However, the syntax structure of the slice header 1020 is different from the syntax structure of the slice header 920 in FIG. 9A. In particular, in the slice header 1020, the dependent_slice_flag is moved up within the slice header in such a way that there is no syntax element preceding the dependent_slice_flag. The dependent_slice_flag is conditionally coded, is coded using a variable length code, or receives the parsing that requires additional computation.

The syntax elements first_slice_in_pic_flag and dependent_slice_flag actually both determine the spatial dependencies. The syntax elements are coded immediately after the NAL header in such a way that no other syntax element needs to be parsed. Since the first_slice_in_pic_flag also carries information which is related to inter-slice dependencies, it may precede dependent_slice_flag. The first_slice_in_pic_flag syntax element is a flag which is set according to the rule that every frame has to start with a normal slice. Accordingly, when the flag first_slice_in_pic_flag is set, it means that the slice is a normal slice and thus independent. Thus, the dependent_slice_flag and the first_slice_in_pic_flag can both be jointly seen as an indicator of inter-slice dependencies.

In other words, the dependency indicator can be defined to include a first slice indication indicating whether or not the slice is a first slice in a picture and a dependent slice flag indicating whether or not the variable length decoding of the slice depends on other slices. The first slice in a picture is always a slice for which the variable length decoding does not depend on other slices.

Advantageously, the bitstream includes a dependent slice enabling flag indicating whether or not dependent slices can be included within the bitstream. The dependency indication is included in the bitstream only when the dependent slice enabling flag indicates that dependent slices can be included in the bitstream. The dependent slice enabling flag is located within the bitstream in a parameter set common for a plurality of slices and located at the beginning of the parameter set. The parameter set may be, for instance, the picture parameter set which carries parameters for a single picture. Alternatively, the dependent slice enabling flag is located within a sequence parameter set which carries parameters for the entire image (video) sequence.

However, in the present disclosure, the dependent_slice_flag (dependency indication) is coded not conditioned on the syntax element dependent_slice_enabled_flag (dependent slice enabling flag). In the present embodiment, since the picture parameter set id is located after the dependency indication, it is advantageous to avoid a possible parsing error in the case of where the picture parameter set id is signaled within the slice header.

This change may also be seen as and/or interpolated by changing the position of the other required syntax elements in the parameter sets or headers for reducing the amount of syntax elements that are required to be parsed for determining the dependencies between slices.

For instance, the syntax element dependent_slice_flag in the slice header of the present syntax of HM8.0 is only present when the syntax element "dependent_slice_enabled_ flag" value indicates that usage of dependent slices within the bitstream is enabled. The enabling of the dependent slices and thus, also the syntax element "dependent_slice_enabled_flag" is included in the PPS as shown in FIG. 9C. Accordingly, the syntax element "dependent_slice_enabled_flag" in the PPS is moved up within the syntax of the PPS in order to simplify its parsing necessary to parse the dependent_slice_flag (for example, the beginning of the parameter set). This can be also useful when the dependent_slice_flag is coded after the pic_parameter_set_id (the syntax element identifying the parameter set). This is because by doing so, the parsing error is avoided even when dependent slice enabling flag is conditioning the presence of the dependency indication.

Instead of moving the "dependent_slice_enabled_flag" up within the PPS, the "dependent_slice_enabled_flag" may be moved from the PPS to the SPS and/or VPS so that the parameters sets which are lower in the hierarchy are not required to be tracked.

In other words, according to the present embodiment, the position of the required syntax elements is changed in order to reduce the amount of parameter sets that need to be kept track of. This also reduces the parsing complexity. The "required parameters" in this context means the parameters meant which contribute to determining whether or not a slice is a inter-dependent slice. A first possibility applicable directly to HEVC is to provide the dependency indication in the beginning of the dependent slice header and unconditioned on the dependent slice enabling flag which is included in a parameter set different from the slice header. A second possibility applicable directly to HEVC is to provide the dependency indication in the dependent slice header after the parameter set indication identifying the parameter set in which the dependent slice enabling flag is included. The dependency indication may be conditioned on the dependent slice enabling flag. Moving up of the dependent slice enabling flag within the PPS or moving the dependent slice enabling flag into SPS may be beneficial for any of these possibilities. In particular, this is beneficial for the second possibility, in which the dependent slice enabling flag is needed to parse the dependency indication.

As can be seen in FIG. 10, the NAL unit header, together with the relevant portion of the slice header, has 18 bits (14 bits of the NALU header and 2 bits of the slice header). According to this example, a media aware network element may operate for a current slice packet as follows. If a previous slice is dropped, which is a normal, an entropy or a dependent slice, the network element checks the first two bits of the current slice header, which are the first_slice_in_pic_flag and (in the case where the dependent slices are allowed for the bitstream) the dependent_slice_flag.

When the NAL unit type is a VCL NAL unit type and the last two bits of the 18 bits checked are "01", the NAL unit is dropped. In particular, when the first bit of the slice header is "1", then it is the first slice in the picture that is (according to rules) not a dependent slice. When the first bit of the slice header is "0" and the next bit of the slice header is also "0", the slice is not dependent. Accordingly, only when the two first bits of the slice header are "01", the slice is dependent. Furthermore, the slice should be dropped since it cannot be decoded when the parent slice was already dropped. Accordingly, the flags first_slice_in_pic_flag and dependent_slice_flag can be seen as an extension of the NAL header, even if they belong to the slice header syntax.

Accordingly, the present embodiment also provides as one of its aspects a network router for receiving, analyzing and forwarding network packets to their destinations. The router includes a receiving unit for receiving a network packet including a packet destination address and a bitstream portion with coded video data; a parser including the apparatus for parsing a bitstream of an encoded video sequence according to any of the above and below cited embodiments, in order to determine dependency of the coded video data from other packets; and a packet analyzer for analyzing the received packet destination address and the determined dependency and for judging how to handle the network packet.

Embodiment 2

According to Embodiment 2, dependent_slice_enabled_flag is dropped from PPS. It should be noted that dependent_slice_enabled_flag may be moved to SPS, instead of being dropped.

FIG. 11 shows an example in which the dependent_slice_enabled_flag does not need to be parsed before accessing first_slice_in_pic_flag and dependent_slice_flag In this example, dependent_slice_enabled_flag is not used because it is not conditioned on the presence of the dependency indication. This example provides the possibility of having the dependency indication at the beginning of the slice header without causing parsing problems due to unknown identification of the current PPS set.

Effect of Embodiment 2, Etc.

In Embodiment 1, in order to parse the dependent_slice_flag, the dependent_slice_enabled_flag has to be parsed. The dependent_slice_enabled_flag is signaled in a PPS. This may cause some parsing overhead as discussed above, when the dependent_slice_enabled_flag is located far from the PPS start and the preceding syntax elements are coded conditionally.

Moreover, signaling of the dependent_slice_flag syntax element before the syntax element pic_parameter_set_id in the PPS is parsed, can create parsing errors as follows. The presence of the dependent_slice_flag depends on the dependent_slice_enabled_flag which is signaled in the PPS. However, the id of the currently active PPS is signaled after the dependent_slice_flag. Therefore, it is not possible to parse the dependent_slice_flag before accessing the previous elements.

Accordingly, it is advantageous to remove the parsing condition on the dependent_slice_enabled_flag. It may be more beneficial, when the following restriction is applied. Namely, if dependent_slice_enabled_flag in PPS is zero, then dependent_slice_flag shall be equal to zero.

However, these advantageous implementations are not to limit the scope of the present disclosure.

Modification 1 of Embodiments 1 and 2

As an alternative or additionally to removing the conditioning on the dependent_slice_enabled_flag, the dependent_slice_enabled_flag may be moved from PPS to either SPS and/or VPS.

Moreover, instead of just moving the dependent_slice_enabled_flag, the dependent_slice_enabled_flag may be duplicated in the SPS. In this case, the indicator in the SPS and PPS might be forced to have the same value. Or, the PPS might be allowed to overwrite the indicator in the SPS.

For instance, when sps_dependent_slice_enabled_flag is equal to 1, then the pps_dependent_slice_enabled_flag can be 0 or 1. Then, sps_dependent_slice_enabled_flag is an indication of enabling the dependent slices for a sequence of pictures signaled in the SPS, and pps_dependent_slice_enabled_flag is an indication of enabling the dependent slices for a picture signaled in the PPS. However, when the value of the dependent_slice_enabled_flag can change in the PPS, this means that parsing of the PPS is still needed and the advantage of less frequent tracking and parsing of PPS is prevented.

These modifications provide the advantage that VPS and SPS carry dependency structures. The carrying of dependency structures by VPS and SPS enables network elements to shape the bit streams, that is, to determine for discarding the dependent packets which cannot be decoded anyhow or for discarding the dependent slices rather than independent slices. Therefore, dependent_slice_enabled_flag in VPS would trigger the router to check the slice header additionally or not.

It is noted that these modifications do not further reduce the parsing complexity if the example of FIGS. 10 and 11 is applied. However, it provides a more beneficial structure of the syntax for carrying the dependency structures. Summarizing, according to this example, an indicator for indicating whether or not dependent slices are enabled for the bitstream is signaled in a video parameter set. The video parameter set is a parameter set applying to more than one slices in more than one pictures.

There are two different advantage of signaling dependent_slice_enabled_flag is VPS and/or SPS. When the flag is just moved or duplicated, PPS is not required to be parsed, reducing the parsing overhead. The other benefit is letting the routers know about the prediction structure of the video sequence. This advantage is present all the time. Usually, a router may check the content of a VPS/SPS in order to know what it will receive.

The VPS is the highest parameter in the hierarchy. The VPS can include information about multiple video sequences, whereas the SPS and PPS are specific to a single video sequence and a picture, respectively. The information in the VPS includes bitrate, temporal_layering structure of the video sequences, and the like. It also includes information about the inter-layer dependencies (dependencies between different video sequences). Accordingly, VPS can be seen as a container for multiple video sequences, and it gives a general overview about each sequence.

In the current HEVC version, the dependency between slices in a frame is established by both dependent_slice_flag and first_slice_in_pic_flag. According to current specifications, network entities cannot use inter-slice dependencies without applying a highly complex parsing. A straightforward solution would be, if there is a packet loss discovered via a missing packet number, to drop all packets until the first_slice_in_pic_flag which is equal to value 1 is encountered. This is because the first slice in a picture is always a normal slice.

However, this solution leads to reduction in the coding efficiency. Therefore, as described above an inter-slice dependency signaling enabling efficient parsing may be used. This is achieved by signaling dependent_slice_flag and first_slice_in_pic_flag within the slice header immediately after the NAL header.

Alternatively or in addition, the syntax elements relating to the inter-slice dependencies are coded unconditionally, that is, independently of the other syntax elements which may be in the slice header or in the PPS.

Modification 2 of Embodiments 1 and 2

FIG. 12 illustrates Modification 2 alternative to Modification 1 discussed above. In particular, the NAL unit header 1210 is the same as the NAL unit header shown in FIG. 10 (NAL unit header 910 shown in FIG. 9A). However, the slice header 1220 and the slice header 1020 shown in FIG. 10 are different in that the slice header syntax elements dependent_slice_flag and first_slice_in_pic_flag are reversed in their order. In particular, the slice header 1220 includes the dependent_slice_flag as a first syntax element, and the syntax element first_slice_in_pic_flag as a second syntax element, conditioned on dependent_slice_flag presence.

As can be seen from this example, a first slice indication indicating whether or not the slice is a first slice in a picture is included in the syntax. A first slice in a picture is always a slice for which the variable length decoding does not depend on other slices. Moreover, the dependent slice flag is included in the bitstream in front of the first slice indication. The first slice indication is included in the bitstream only when the dependent slice flag does not indicate a dependent slice. This arrangement provides the same advantages as the conditioning. In other words, the dependency flag is conditioned on the first slice indication. As can be seen in FIG. 12, both elements may be understood as the dependency indication and are included at the beginning of the slice header.

Embodiment 3

In Embodiment 3, compared with Embodiments 1 and 2, the arranging method of the syntax elements is changed in order to reduce parsing of unnecessary syntax elements.

In the above described embodiments, dependent_slice_flag is described in the case where first_slice_in_pic_flag is included as condition for the presence of dependent_slice_flag. However, the first_slice_in_pic_flag and dependent_slice_flag may be both included in the bitstream without being conditioned one on the presence of the other. For instance, the coding method of the dependent_slice_flag is changed in order to be independent of the syntax element dependent_slice_enabled_flag according to one of the modifications described above.

FIG. 13 is a diagram showing an example of a slice header according to the present embodiment. FIG. 13 illustrates the case of still including the conditioning of the dependency indication on the dependent slice enabling flag.

Specifically, in the slice header according to the present embodiment, the dependent_slice_flag is disposed before the slice_address compared with the existing slice header shown in FIG. 6. Furthermore, in the slice header according to the present embodiment, compared with the examples in FIGS. 10 to 12, dependent_slice_flag is disposed after pic_parameter_set_id.

In the present embodiment, since dependent_slice_flag is disposed before the slice_address, at least the SPS does not need to be parsed for the parsing of dependent_slice_flag. As described above, the slice_address is a syntax element indicating the start of a slice. Furthermore, the slice_address can only be parsed with the help of syntax elements signaled within the SPS (pic_parameter_set_id).

Alternatively or in addition, the dependent_slice_enabled_flag is either moved upward within the PPS or it is moved to the SPS and/or VPS. If the enabled flag is in the VPS and/or in the SPS, it may not be required to parse and keep track of the PPS and the SPS.

Modification of Embodiment 3, Effect, and the Like (1) The example of FIG. 13 may lead to providing an apparatus for parsing a bitstream of a video sequence coded at least partially with a variable length code and including data units carrying coded slices of video images. In this case, the apparatus is configured to include a parser which extracts from the bitstream the following syntax elements:

a dependency indication which is a syntax element indicating for a slice in the slice header whether or not the variable length decoding of the slice depends on other slices;

a dependent slice enabling flag included within a parameter set for a plurality of slices and indicating whether or not dependent slices can be included within the bitstream; and a slice address indicating the position within the bitstream at which the slice starts.

(2) Moreover, in the present embodiment, the dependency indication is signaled within the slice header before the slice address and after a syntax element identifying the parameter set.

With this embodiment, it is possible without causing parsing errors to configure that the dependency indication is included in the bitstream only when the dependent slice enabling flag indicates that dependent slices can be included in the bitstream.

(3) In the present embodiment, the dependent slice enabling flag is located within the bitstream in a parameter set (PPS) common for a plurality of slices forming the same picture frame and located at the beginning of the parameter set. However, it is not limited to such.

Alternatively (or in addition), the dependent slice enabling flag is located within the bitstream in a parameter set (SPS) common for a plurality of slices forming the same sequence of pictures. Still alternatively (or in addition), the dependent slice enabling flag is located within the bitstream in a parameter set (VPS) common for a plurality of slices forming a plurality of sequences of picture frames.

(4) Moreover, in the present embodiment, the VPS_id and the SPS_id may be signaled explicitly in a SEI message. When the dependent_slice_enabled_flag is signaled in the SPS, the dependent_slice_flag must still follow pic_parameter_set_id.

Otherwise, parsing dependency is introduced because the SPS_id is signaled in the PPS. With signaling the identification of the current SPS or VPS which carry the dependent_slice_enabled_flag, the dependency indication may be included also before the pic_parameter_set_id since then the picture parameter set parsing is not necessary. Moreover, such SEI message, carrying the VPS_id or SPS_id is not necessary for the decoding operation since these IDs are also determined by parsing the PPS. The SEI message can thus be discarded without affecting the decoding operation after being used by the network elements Embodiment 4

In Embodiment 4, the inter-slice dependency information is duplicated (supplementary to the information signaled in the slice header and/or in a parameter set) in another NAL unit such as an SEI message.

For instance, an SEI message may be defined which conveys the inter-slice dependency information in every access unit or before each dependent slice. The term "access unit" refers to a data unit which is made up of a set of NAL units. An access unit includes coded picture slices, that is, VCL NALUs. In particular, the access units may define points for random access and may include NALUs of a single picture. However, the access unit is not necessarily a random access point.

In the current HEVC specifications, the access unit is defined as a set of NAL units that are consecutive in decoding order and contain exactly one coded picture. In addition to the coded slice NAL units of the coded picture, the access unit may also contain other NAL units not containing slices of the coded picture. The decoding of an access unit always results in a decoded picture. However in a future extension of the HEVC (like Multi-View Coding, (MVC) or Scalable Video Coding, (SVC)), the definition of the access unit may be relaxed/modified. In accordance with the current specifications, the access unit is formed by an access unit delimiter, SEI messages, and VCL NALUS.

According to the present embodiment, the dependency indication is located within the bitstream out of the header of a slice to which the dependency indication relates. Moreover, it may be beneficial when the dependency indication is located within the bitstream in a supplementary enhancement information message included in the bitstream before the dependent slice or once per access unit.

Embodiment 5

According to Embodiment 5, the inter-slice dependency information is signaled in the NAL header as a flag or implicitly as a NAL unit type with which it is associated.

As a rule, the parsing of syntax elements in the NAL header does not depend on any other syntax elements. Every NAL unit header can be parsed independently. The NAL header is the usual place for signaling dependency information. Accordingly, in accordance with the present embodiment, also the inter-slice dependency is signaled therewithin.

In other words, the parsing apparatus may be adopted in a router or in a decoder. The parsing apparatus further includes a network adaptation layer unit for adding to a slice of coded video data and to the header of the slice a network adaptation layer, and NAL header. Advantageously, the dependency indication is located within the bitstream in the NAL header and is coded independently of the other syntax elements.

The dependency indicator may be placed within the NAL header since the NAL header in current HEVC specifications envisages some reserved bits which can be used therefor. A single bit would be enough to signal the dependency indication.

Alternatively, the dependency indication is indicated by a NAL unit type and a predefined NAL unit type is reserved to carry dependency information.

Embodiment 6

It is noted that the above five embodiments may be arbitrarily combined in order to enable an efficient parsing of the dependency information in the network elements. Even when their usage is redundant, the embodiments are combinable. Accordingly, the duplicating of the dependency indication can be applied even when the dependency indication is also signaled at the beginning of the slice header.

FIG. 14 shows an example of the NAL unit header 1410 in which the NAL unit header 910 shown in FIG. 9A is modified. The NAL unit header 1410 includes dependent_slice_flag.

Moreover, in order to move the dependent_slice_flag into the NAL header and to keep the size of the NAL header fixed due to backward compatibility, the one bit necessary for the dependent_slice_flag is taken from the syntax element nuh_reserved_zero_6 bits of the NAL unit header. Accordingly, the syntax element nuh_reserved_zero_6 bits now only has 5 bits. The syntax element nuh_reserved_zero_6 bits includes bits reserved for future use so that the reduction does not cause any problems and does not require any further modifications.

In general, a current VCL NAL unit depends on the previous VCL NAL unit which has the same temporal_layer_id. When the dependent_slice_flag is signalled in the NAL header, one bit will be wasted for both VCL and non-VCL NAL units since every data unit such as picture slice or parameter set has the same NAL header. Accordingly, although it seems that the dependent_slice_flag would also be signaled for parameter sets or for SEI messages, this is unnecessary. Moreover, dependent_slice_flag always needs to be signaled even if the dependent slices are disabled in the sequence parameter set. This leads to an unnecessary overhead.

In all above embodiments, the dependency indication may be a one-bit flag.

Embodiment 7

According to Embodiment 7, the dependency indication is indicated by a NAL unit type and a predefined NAL unit type is reserved to carry dependency information.

Accordingly, a new (separate) VCL NAL type is defined with a similar semiotics as the existing VCL NAL units. For instance, when NAL_unit_type is equal to 15 (or to another predefined type or NALU which is not reserved for another particular type of NALU), then the current VCL NAL unit depends on the previous VCL NAL unit that has the same temporal_layer_id. The dependency relates to the dependency of the current slice on the slice header of a preceding slice, as described above, that is, dependency in parsing.

It may be advantageous in these cases to include the bit in the NAL header to the additional NAL unit types. This can be used to indicate whether or not the current slice is a dependent slice.

When the dependency information is signaled in the slice header in addition to the NAL header, the signaling in the NAL header becomes optional. Specifically, when the NAL_unit_type field in the NAL header is configured to signal that the current slice is a dependent slice, then it is not possible to signal any other "type" information. For instance, in some cases it might be more beneficial to convey the information that a current slice is a "first picture in the sequence" (NAL_unit_type equal to 10 or 11). When the inter-slice dependency information in the NAL header is optional (since it is duplicated in the slice header), it may be chosen to signal the more valuable information.

It may moreover be advantageous to add two or more VCL NAL unit types, such as "dependent slice RAP picture" (required for parsing) or "dependent slice not RAP picture". "RAP" denotes the random access picture. Random access picture is a picture coded independently (in terms of prediction) of other pictures so that such picture may be used as a starting point for coding and decoding. With this, it is thus suitable as a random access point.

In the dependent slice header, the syntax element RapPicFlag is used in the parsing process. Specifically, the syntax element RapPicFlag is an indication indicating whether or not the current picture is a random access picture.

The value of the RAPPicFlag depends on the NAL unit type I ike the following Expression 2.

[Math. 2]

$$RapPicFlag=(nalunit\_type \geq 7 \text{ \& } \&nal\_unit\_type \leq 12) \quad \text{(Expression 2)}$$

In other words, in the example shown in FIG. 15, the random access pictures are carried by NALUs with NALU type between 7 and 12. In order to enable correct parsing and to provide a possibility of slice dependency for the random access pictures, therefore, in the present disclosure, two different NAL unit types are defined in order to guarantee correct parsing of the slice header.

As a general rule, even when a new VCL NAL unit type is defined, the parsing of the slice header should still be possible without any problem. Either of multiple NAL types is defined as above or the dependent slice header is changed in such a way that there is no parsing problem.

When a new VCL NAL unit type is defined to indicate the dependent slice, the slice header syntax structure can be changed as follows.

In the example above the NAL unit type "DS_NUT" is used to indicate that the current VCL nal unit is a dependent slice. Compared to the state-of-the-art slice header syntax structure that is described in Non Patent Literature 3, the following two changes are introduced in the present embodiment.

(1) no_output_of_prior_pics_flag is not signaled in the dependent slice header. In other words the presence of no_output_of_prior_pics_flag is based on the condition that the current slice is not a dependent slice. (no_output_of_prior_pics_flag can be present in the slice header when the current slice is not a dependent slice).

(2) first_slice_in_pic_flag is signaled conditionally on the value of the nal_unit_type. When the value of the nal_unit_type indicates that the current slice is a dependent slice, the syntax element first_slice_in_pic_flag is not signaled explicitly and inferred to be 0. This saves bit rate at the same quality.

According to the example, no_output_of_prior_pics_flag is not signaled when the current slice is a dependent slice. Accordingly the value of the RapPicFlag is not required to be evaluated when the current slice is a dependent slice. Therefore the slice header of a dependent slice can be parsed without a problem. More specifically, the slice header of the dependent slice can be parsed without referring to the NAL unit header of a preceding nal unit header. A problem occurs when the preceding nal unit header is not present at the time of decoding.

Secondly, the first_slice_in_pic_flag is signaled based on the value of the NAL_unit_type. This change is the same as that of the example described in FIG. 12. In FIG. 12, first_slice_in_pic_flag is signaled in the slice header only when the current slice is not a dependent slice (which is indicated by the dependent_slice_flag). Similarly in the above example first_slice_in_pic_flag is signaled only when the nal_unit_type is not equal to "DS_NUT", which means that the current slice is not a dependent slice.

The two changes that are presented above are not required to be done together. It is also possible to perform only one of the changes in the slice header. The benefit of each change is associated with the cost to check whether or not a slice is a dependent slice. However, when the two changes are performed together, the benefits of both changes can come both for the same costs as the benefit of each of the individual changes in the case where the two syntax elements first_slice_in_pic_flag and no_output_of_prior_pics_flag are coded consecutively. Thus, the application of both changes in combination with a consecutive coding of the mentioned two syntax elements gives an advantage over the straight forward application of each of the changes individually.

In all of the explanation in the embodiments, it is also possible to remove dependent_slice_enabled_flag from the bitstream when the dependent slice indication is not coded conditionally on it. In other words, when for instance a new NAL unit type is used to indicate that the current slice is a dependent slice, then the dependent_slice_enabled_flag can be removed from the bitstream.

FIG. 15 shows a NAL unit header 1510 that is the same as the NAL unit header 910 shown in FIG. 9A and a slice header 1520 which is changed from the slice header 920 shown in FIG. 9A. The slice header 1520 includes the termination of the dependent_slice_flag value in accordance with the type of the NALU. In particular, NAL_unit_type syntax element with values 15 and 16 define dependent slices. When NAL_unit_type is equal to 15, the type of the slice is a dependent slice of random access picture. If, on the other hand, NAL_unit_type is equal to 16, the slice is a dependent slice of a non-random access picture. Therefore, a relationship of the following Expression 3 is established.

[Math. 3]

$$RapPicFlag=(nal\_unit\_type \geq 7 \&\& nal\_unit\_type \leq 12 || nal\_unit\_type = \times 15) \quad \text{(Expression 3)}$$

It is noted that the values 15 and 16 were selected only as an example. As is clear to those skilled in the art, any predefined numbers may be adopted which are not used otherwise. Specifically, a first type of NALU is to be defined for identifying a dependent slice content of a random access picture, and a second type of a NALU is to be defined for identifying a dependent slice content of a non random access picture.

Moreover, a restriction may be applied that the dependent slices are only used for RAPs or only used for non-RAPs. In such cases, only one new NALU type is necessary.

Embodiment 8

FIG. 16 is a diagram showing an alternative solution. A NAL unit header 1610 is the same as the NAL unit header 910. The slice header 1620 assumes the definition of NAL_unit_type with the values 15 and 16 signaling dependent slices as described above.

However, the NAL unit type is not used in the parsing of the dependent slice flag. This enables the usage of the NAL_unit_type being optional for the encoder. Accordingly, the advantage of the present embodiment is only achieved when the encoder is determined to adopt the new NALU types.

Then, the router only needs to look into the NALU type. However, when the encoder does not use the new NALU types, the router would treat the dependent slices as in the state of the art.

Summarizing, the dependency indication may be indicated by a NAL unit type. A predefined NAL unit type may be reserved to carry coded slices the slice header of which depends on slice header of a preceding slice. Advantageously, a separate NAL unit type indicating the dependency is provided for random access pictures and for non random access pictures.

Summarizing, the above described embodiments relate to syntax of a bitstream carrying encoded video sequences. In particular, the above described embodiments relate to syntax related to dependent and entropy slices, of which the slice header depends on the slice header of a preceding slice. In order to allow a media-aware network element to consider this kind of dependence without essentially increasing its complexity and delay due to parsing, the indication of dependency is signaled at the beginning of the packets or in other words in the proximity of the headers or parameters which are to be parsed. This is achieved for instance, by including the dependency indication at the beginning of the slice header (FIGS. 10 to 12), possibly after the parameter set identifier and before the slice address, or by including the dependency indication before the slice address (FIGS. 10 and 11), or by providing the dependency indication in a NALU header (FIG. 14), in a separate message or by a special NALU type for NALUs carrying dependent slices (FIGS. 15 and 16).

Modifications of Embodiments 1 to 8, Effect, and the Like

Various modifications and corrections are possible for the embodiments according to the present disclosure.

Each of the structural elements in each of the above-described embodiments may be configured in the form of an exclusive hardware product (processing circuit), or may be realized by executing a software program suitable for the structural element. Each of the structural elements may be realized by means of a program executing unit, such as a CPU and a processor, reading and executing the software program recorded on a recording medium such as a hard disk or a semiconductor memory.

Although in Embodiments 1 to 8, the description assumes wavefront, it is not limited to such.

However, in the case or wavefront, all substreams cannot be started at the same time. As described above, regarding each of the substreams except for the substream at the beginning, the start of processing (coding or decoding) is delayed by two LCUs from the preceding substream. Therefore, in wavefront, a further shortening of the processing is required. In the present embodiment, by locating the dependency indication (dependent_slice_flag) after the syntax which identifies PPS and before the slice address, the number of syntax elements to be parsed can be reduced and thus the processing is reduced.

Moreover, in the above described Embodiments 1 to 8, by arranging the dependency indication upward within the slice header (notably at the beginning), it is possible, for example, to check whether or not each of the slices is a dependent slice at an early stage of the picture processing.

In other words, at the time of the start of processing on a picture (coding or decoding), when a step of checking whether or not each of the slices is a dependent slice, it is possible to extract a starting point of the parallel processing at the time of the start of processing on the picture. In other words, when the picture includes a plurality of normal slices, it is possible to extract a starting point of the parallel processing at the time of the processing on a picture or at an early stage of the processing.

Here, conventionally, when the dependency indication is disposed after the slice address, it is not possible to check whether the slice is a dependent slice or a normal slice until the parsing of the slice address is completed. In this case, the start of the processing on the normal slice in the middle of the picture is significantly delayed from the start of the processing on the normal slice at the beginning of the picture.

Conversely, in the above described Embodiments 1 to 8, since it is possible to check whether or not each of the slices is a dependent slice at an earlier stage of the processing on a picture, it is possible to expedite the start of the processing on a normal slice in the middle of the picture. In other words, it is possible to start the processing on the normal slice in the middle of a picture at the same time as the normal slice at the beginning of the picture.

Embodiment 9

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 17:
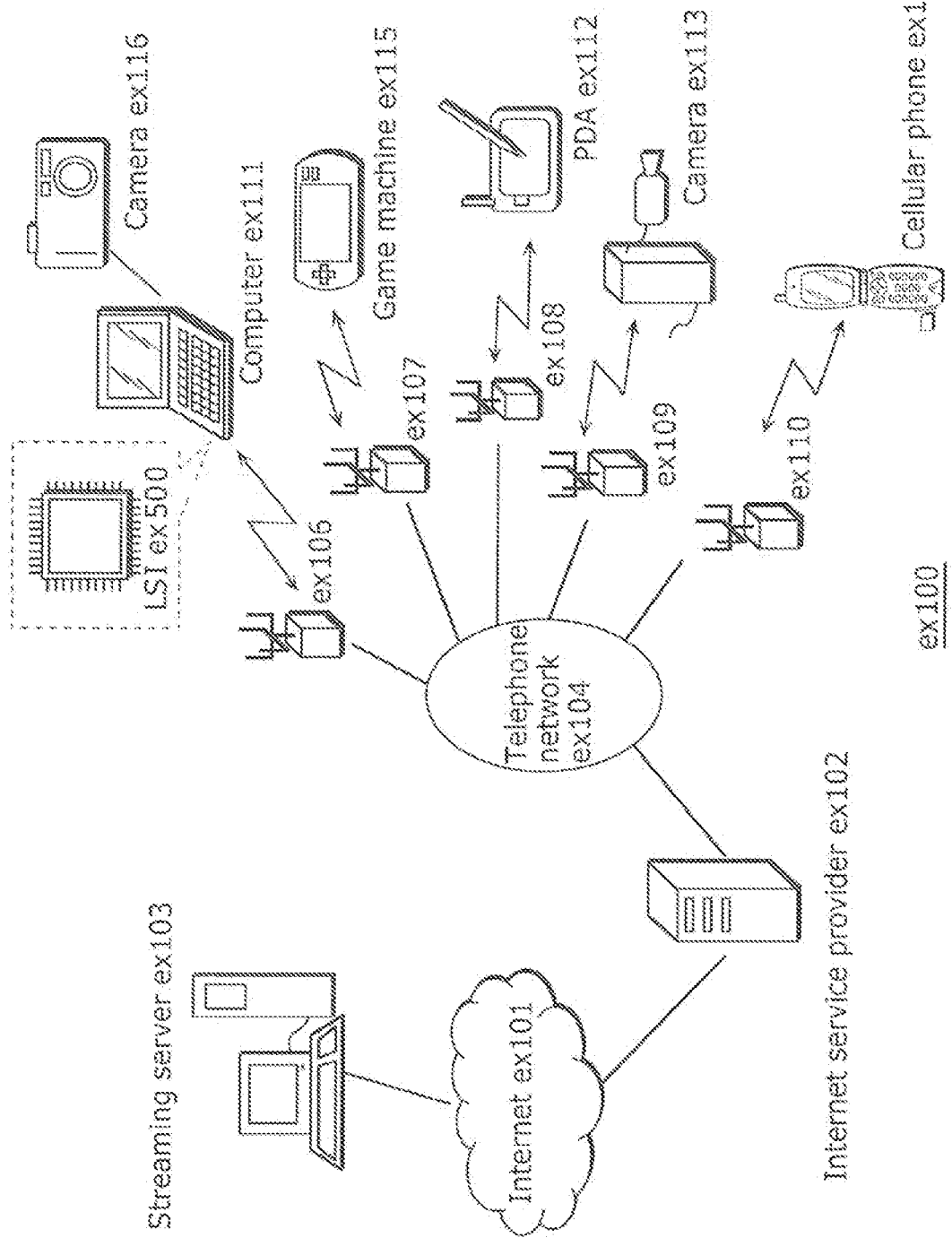
FIG. 17 shows an overall configuration of a content providing system for implementing content distribution services.

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that t are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 18:
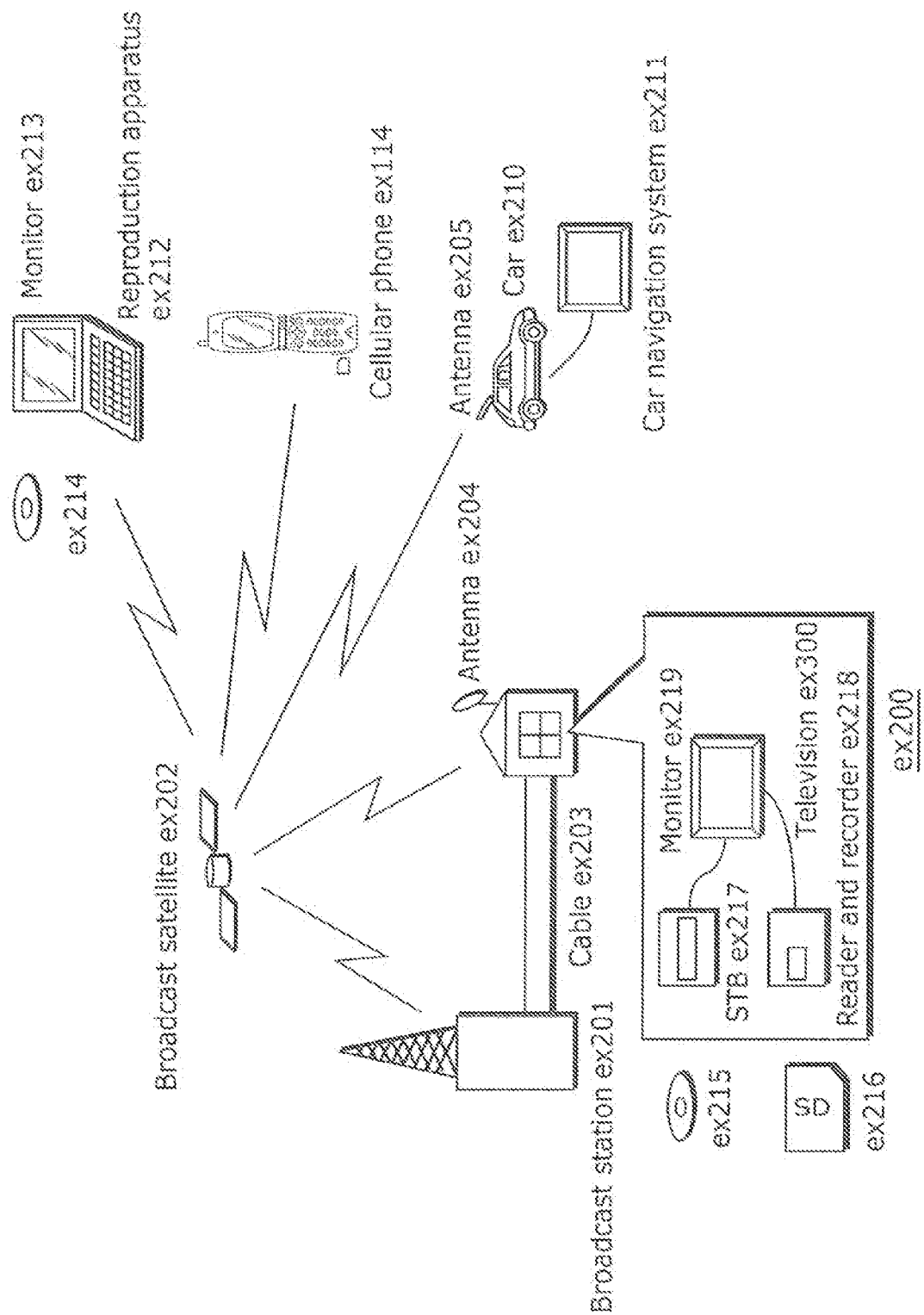
FIG. 18 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (*i*) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 19:
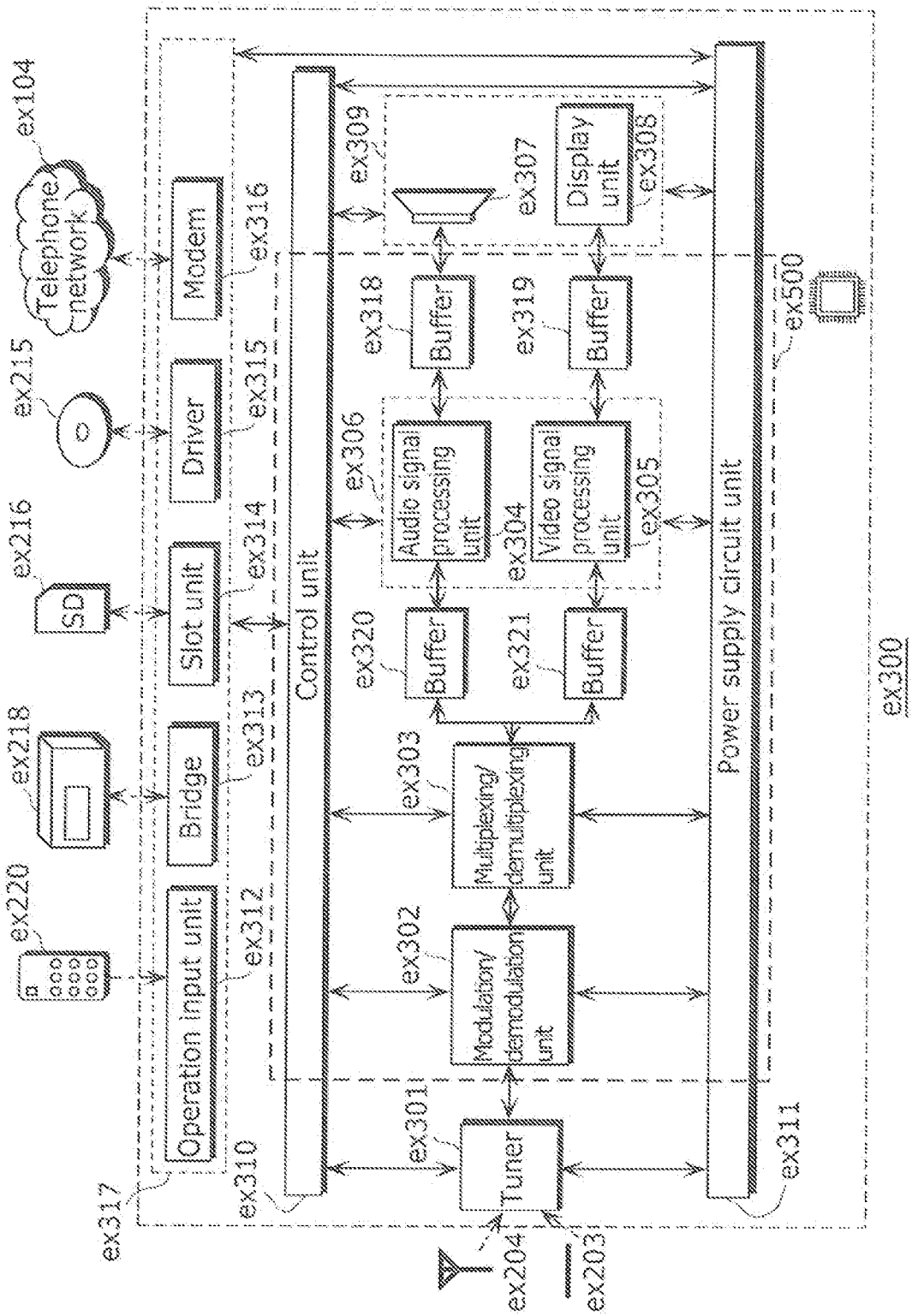
FIG. 19 is a block diagram illustrating an example of a configuration of a television.

FIG. 19 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 20:
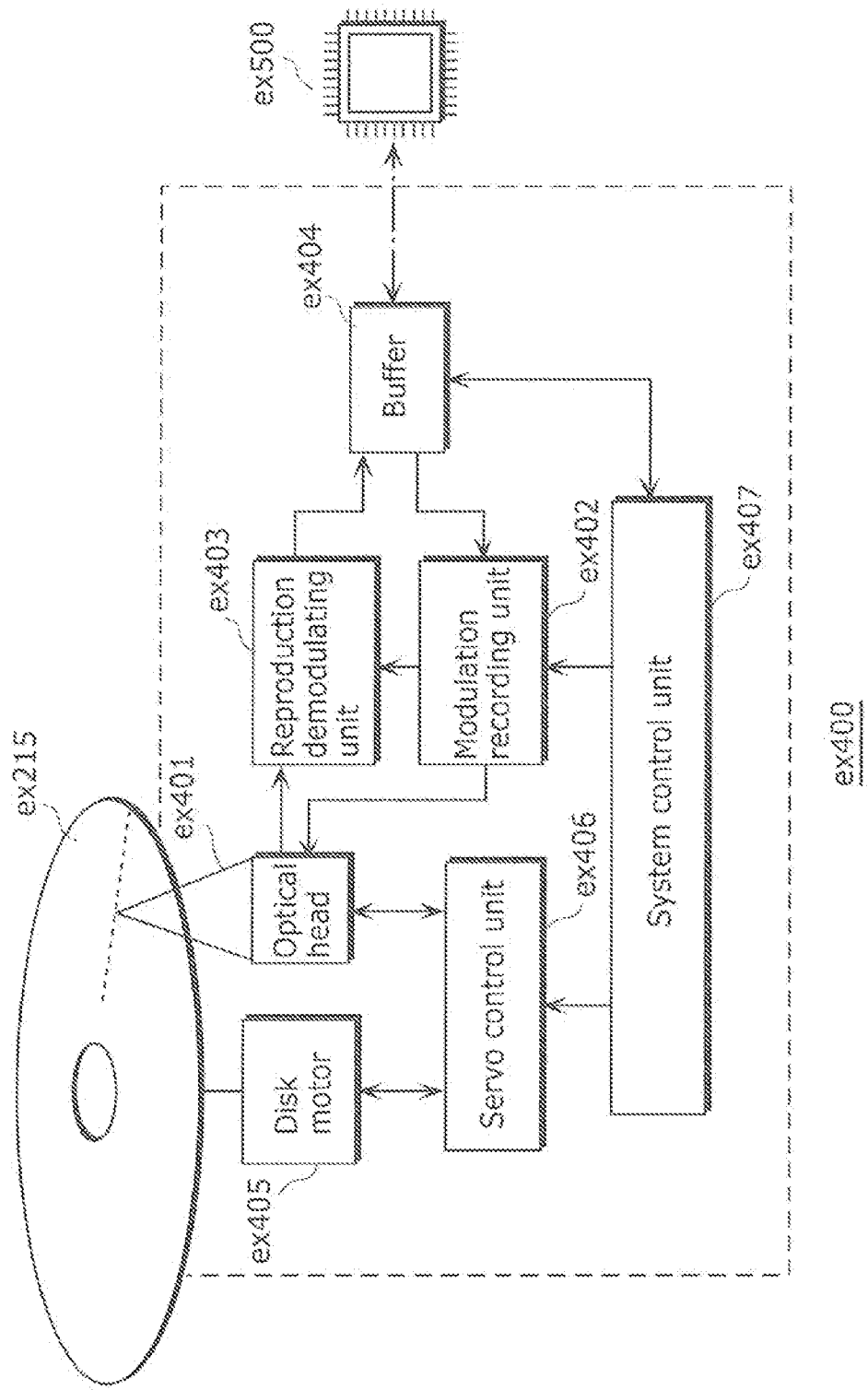
FIG. 20 shows a block diagram illustrating an example of a configuration of an information reproducing/recording unit that reads and writes information from and on a recording medium that is an optical disk.

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
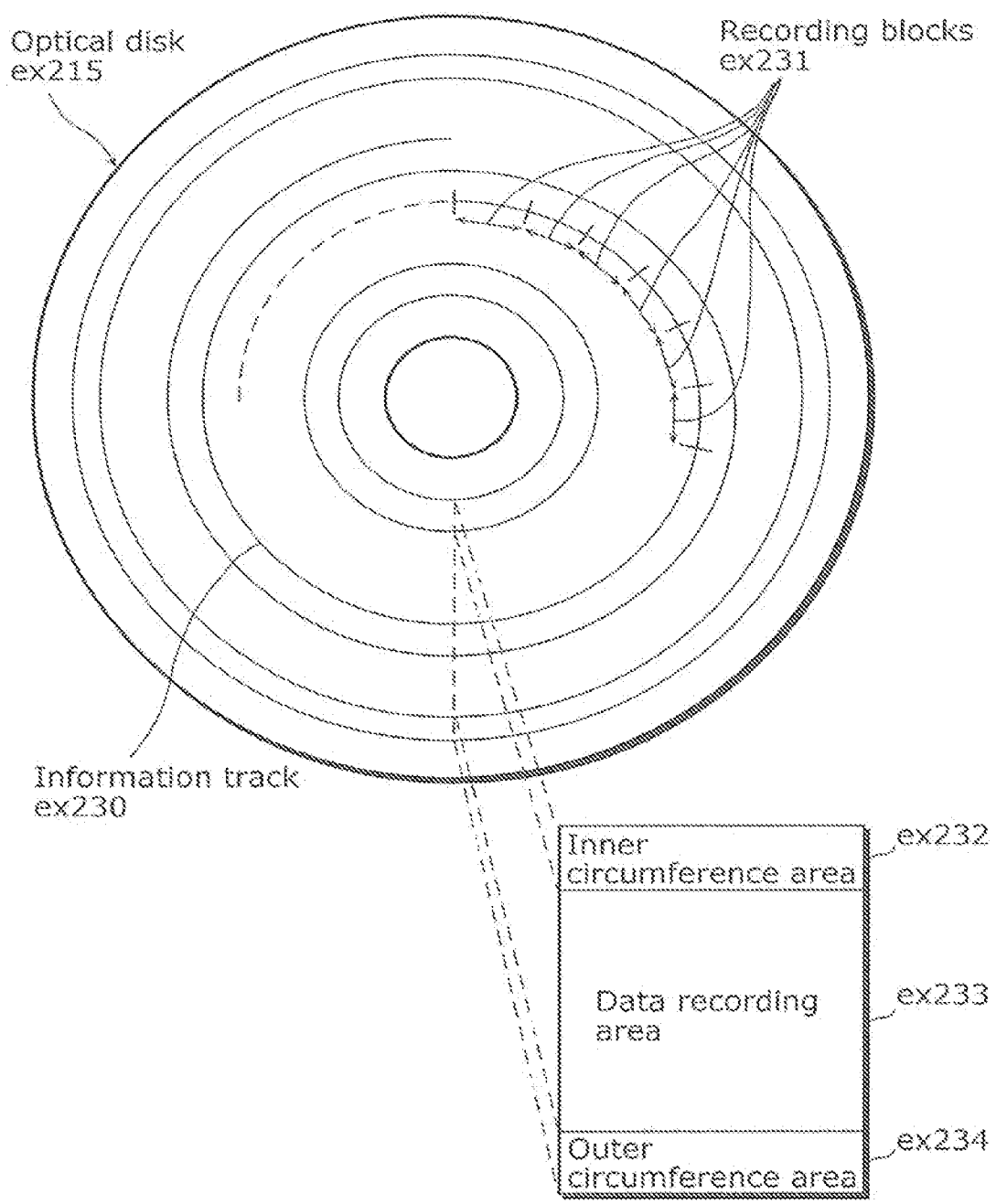
FIG. 21 shows an example of a configuration of a recording medium that is an optical disk.

FIG. 21 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others.

Figure 22A:
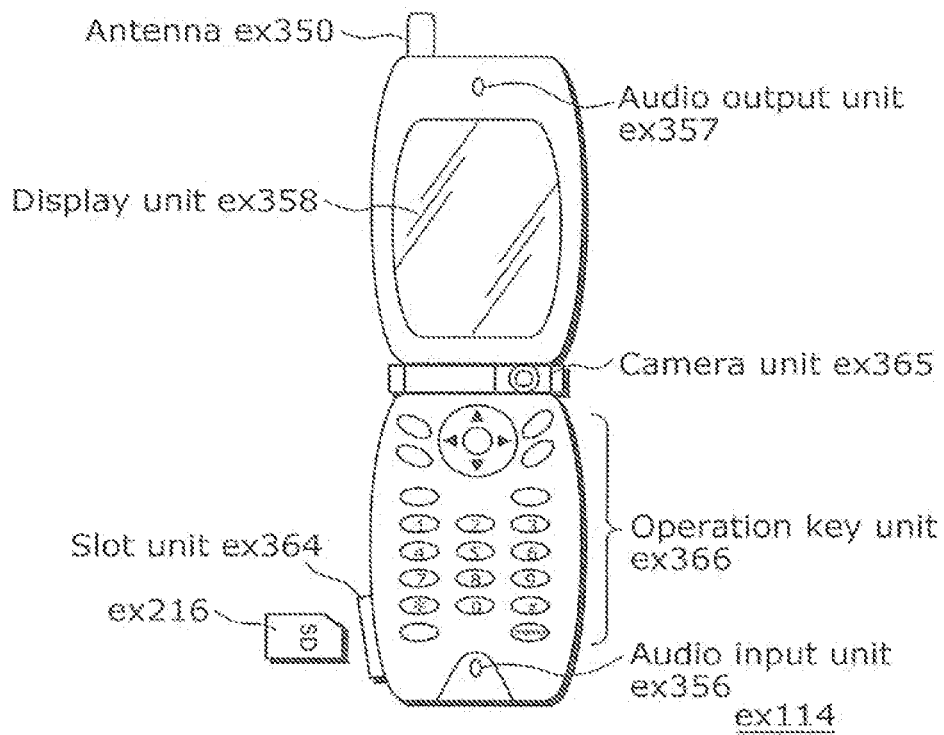
FIG. 22A shows an example of a cellular phone.

FIG. 22A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 22B:
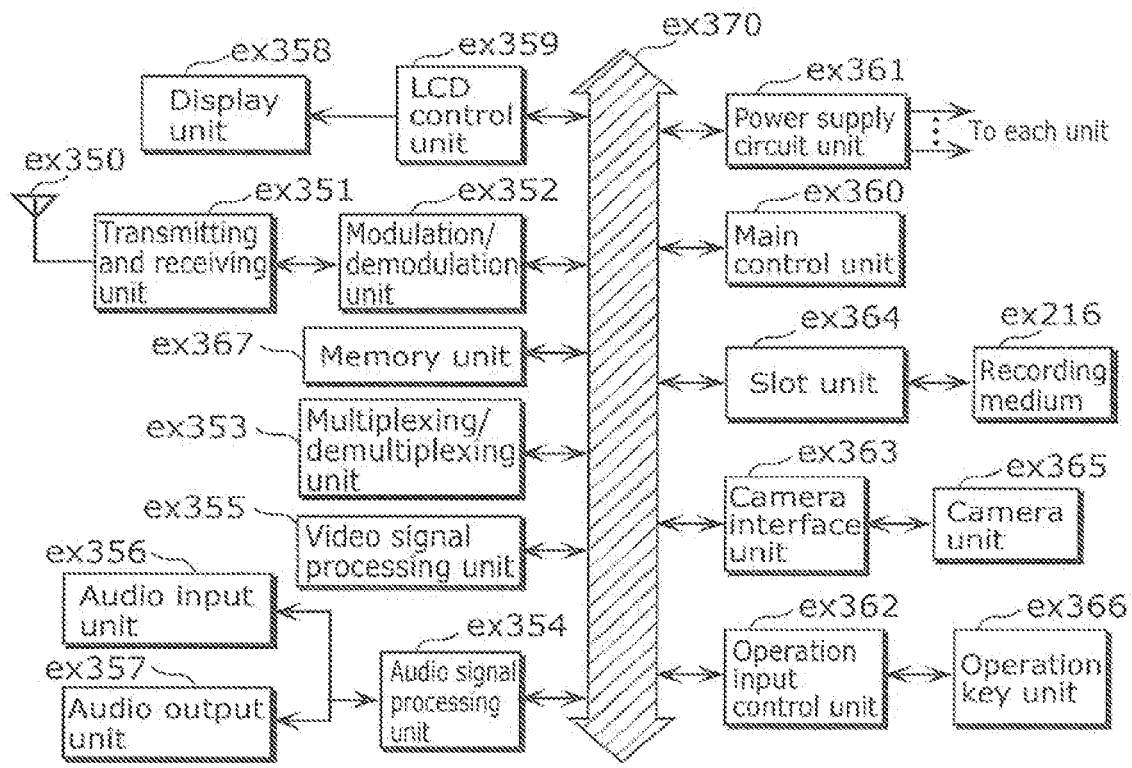
FIG. 22B is a block diagram showing an example of a configuration of a cellular phone.

Next, an example of a configuration of the cellular phone ex114 will be described with reference to FIG. 22B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main unit ex360 control causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits s the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the antenna ex350, the multiplexed data received via the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, it is possible for a terminal such as the cellular phone ex114 to have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Ithough the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

Embodiment 10

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since the standard to which each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 23 illustrates a structure of multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 24:
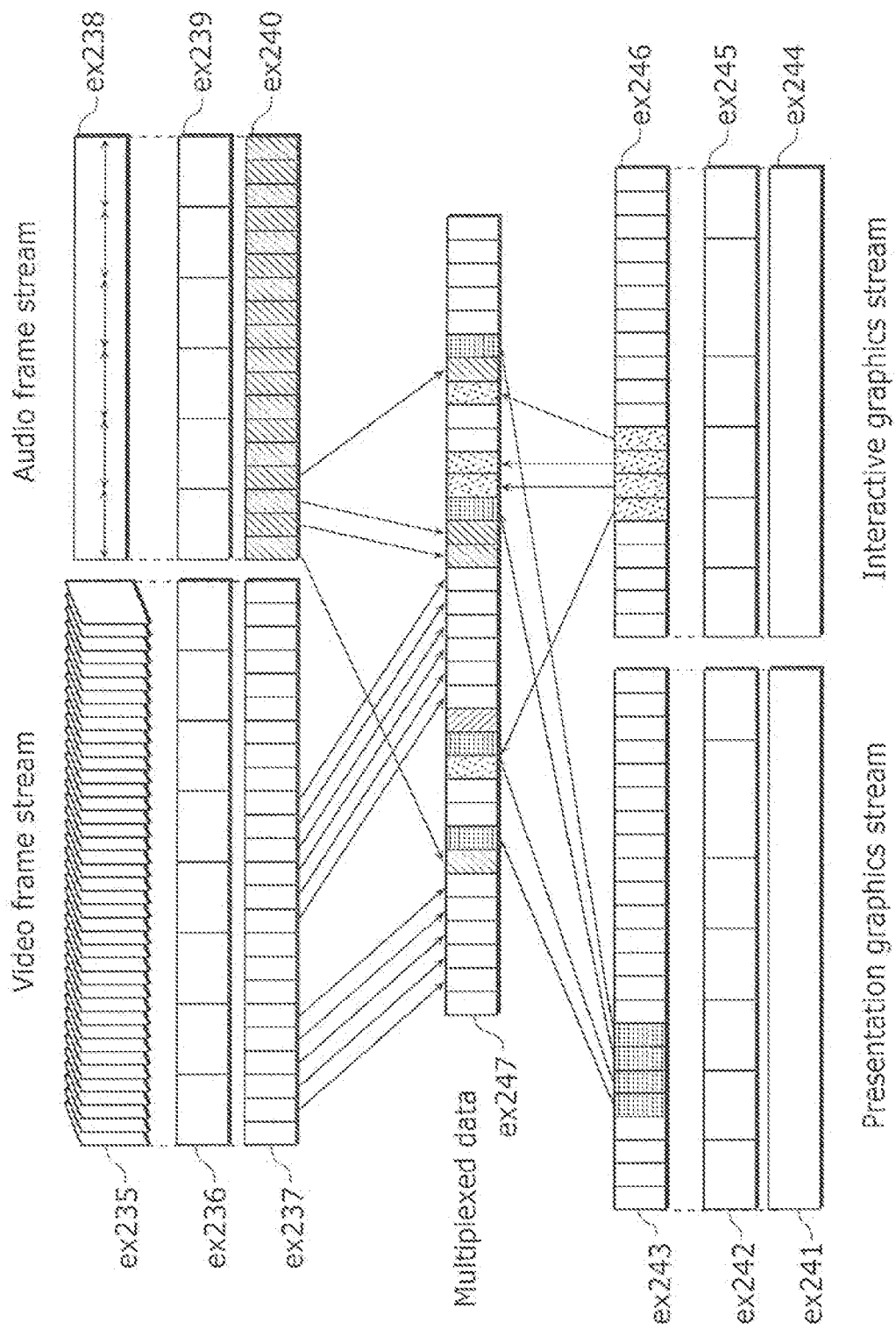
FIG. 24 schematically shows how each stream is multiplexed in multiplexed data.

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 25:
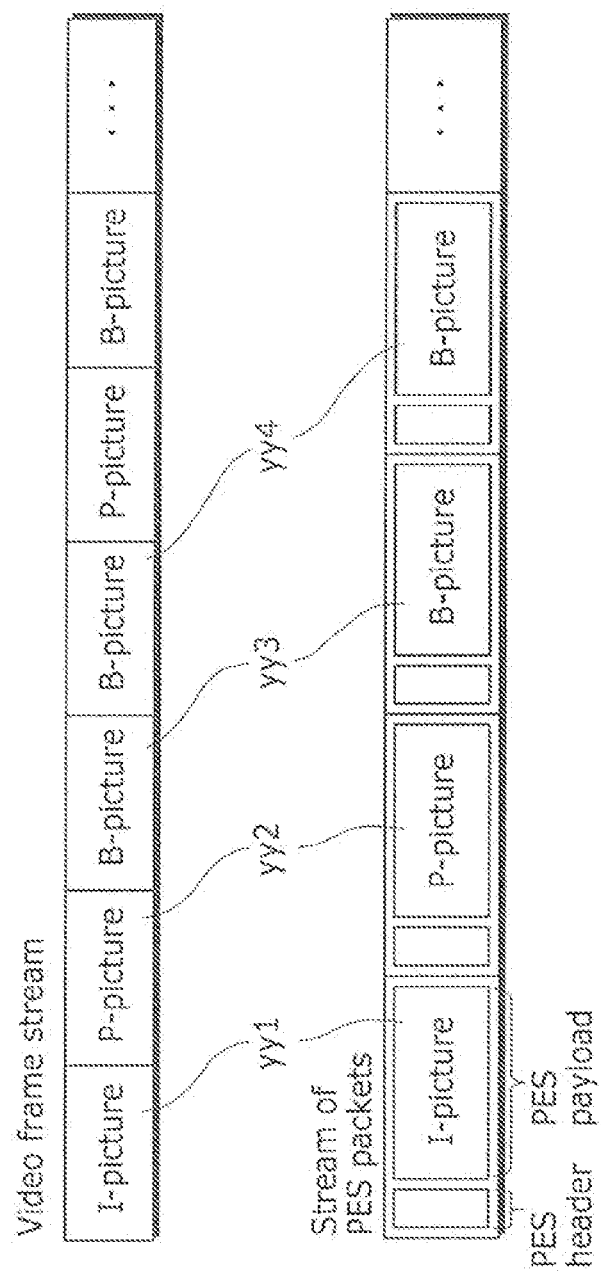
FIG. 25 shows how a video stream is stored in a stream of PES packets in more detail.

FIG. 25 illustrates how a video stream is stored in a stream of PES packets in more detail. The first bar in FIG. 25 shows a video frame stream in a video stream. The second bar shows the stream of PES packets. As indicated by arrows denoted as yy1, yy2, yy3, and yy4 in FIG. 25, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 26:
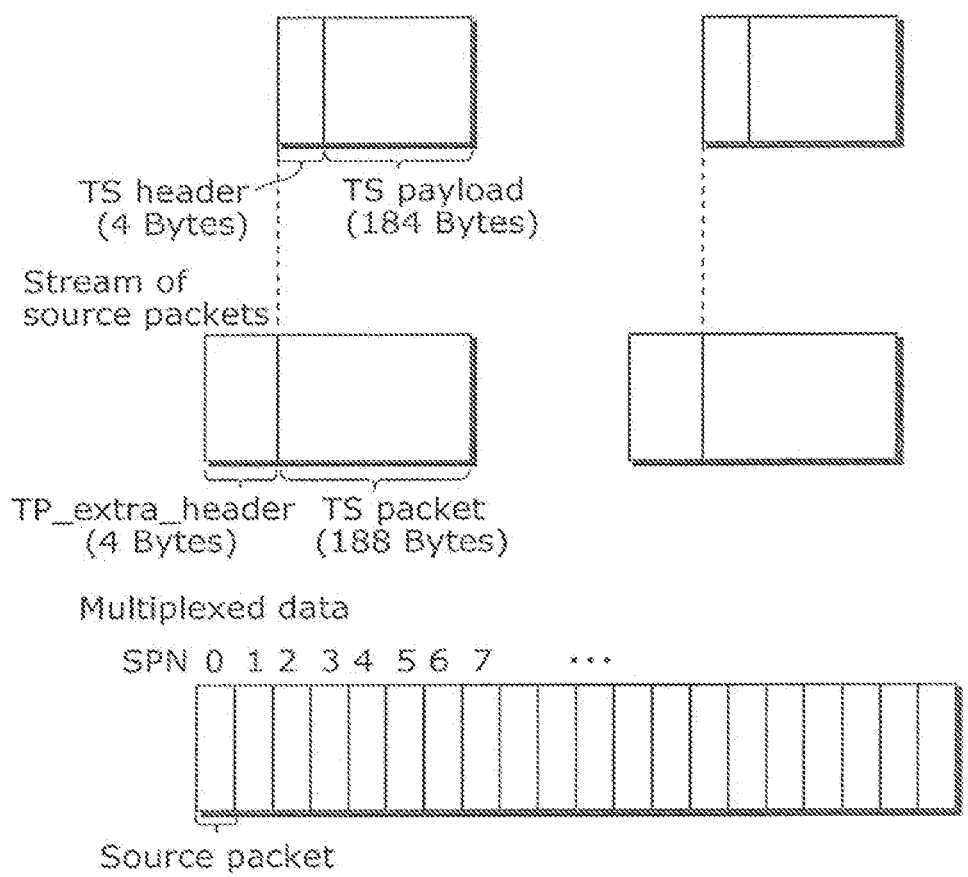
FIG. 26 shows a structure of TS packets and source packets in the multiplexed data.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are disposed in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 27:
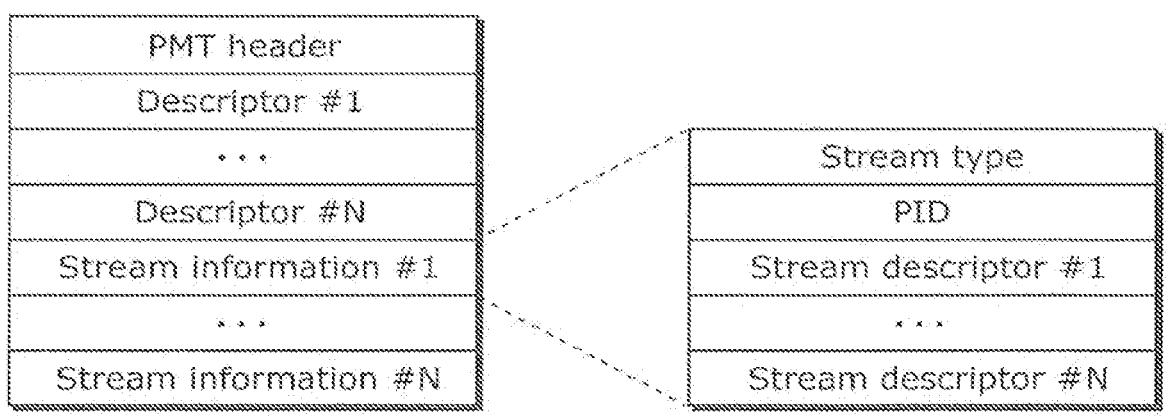
FIG. 27 shows a data structure of a PMT.

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 28:
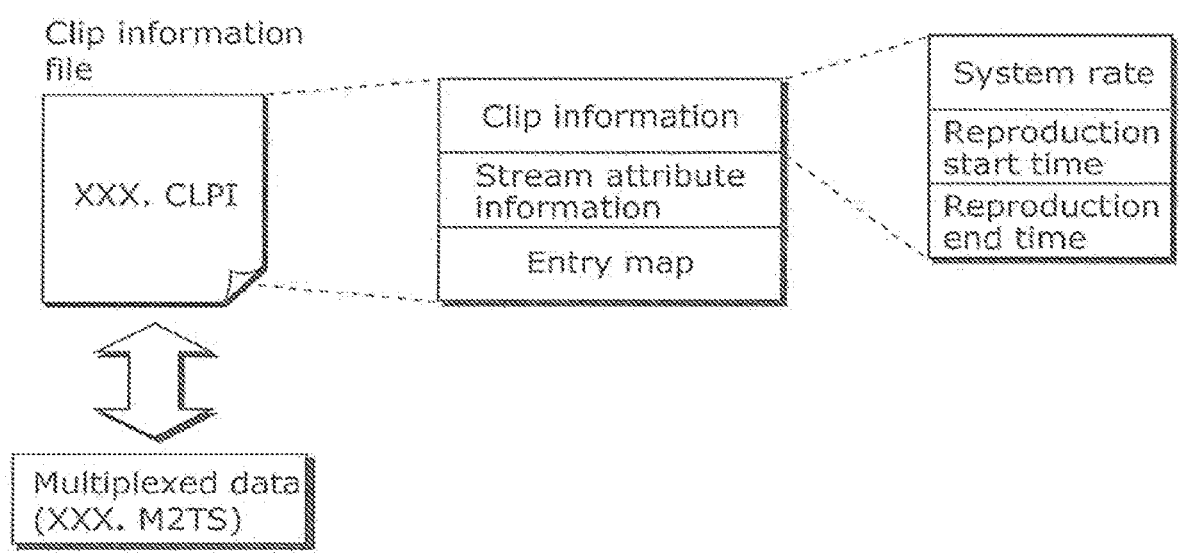
FIG. 28 shows an internal structure of multiplexed data information.

Each of the multiplexed data information files is management information of the multiplexed data as shown in FIG. 28. The multiplexed data information files are in one to one correspondence with the multiplexed data, and each of the files includes multiplexed data information, stream attribute information, and an entry map.

As illustrated in FIG. 28, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 29:
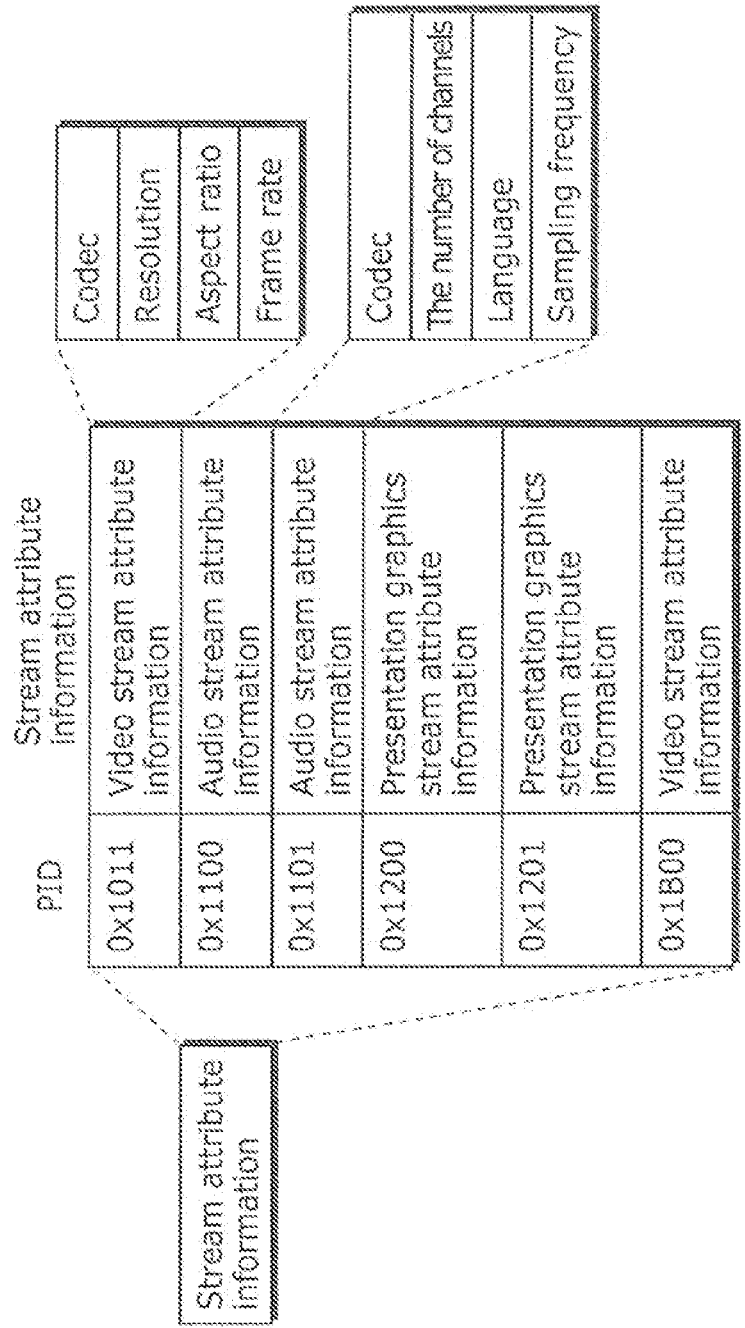
FIG. 29 shows an internal structure of stream attribute information.

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 30:
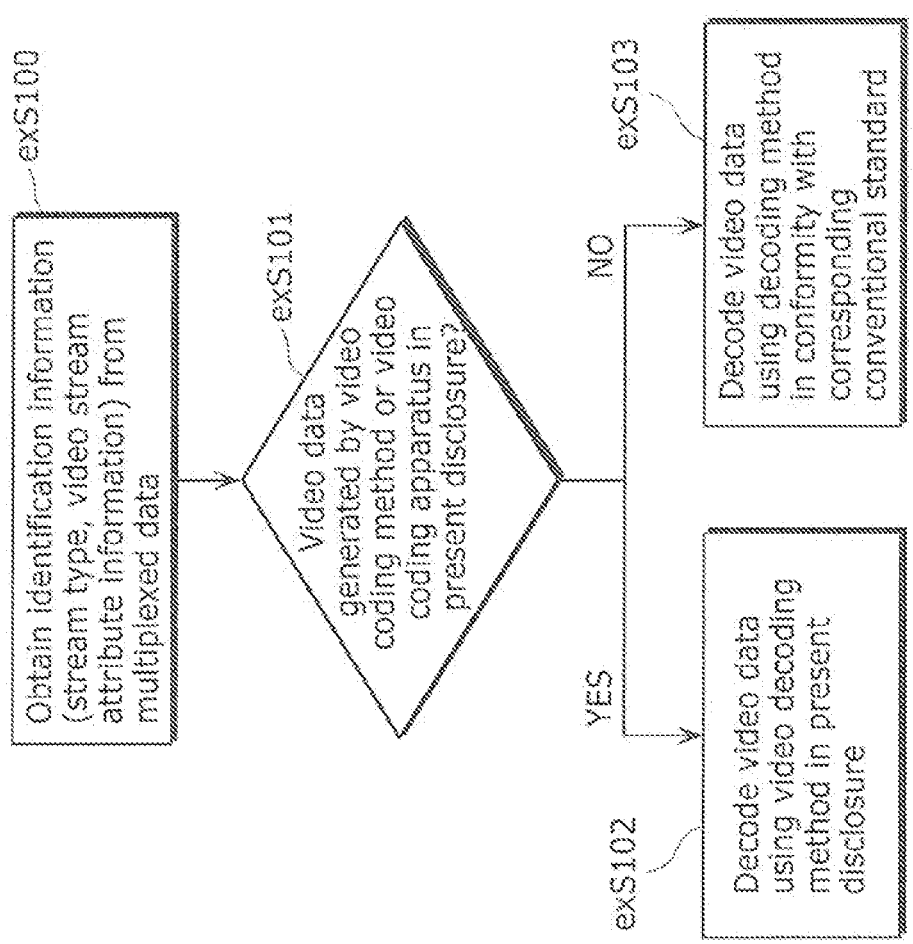
FIG. 30 shows steps for identifying video data.

Furthermore, FIG. 30 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 11

Figure 31:
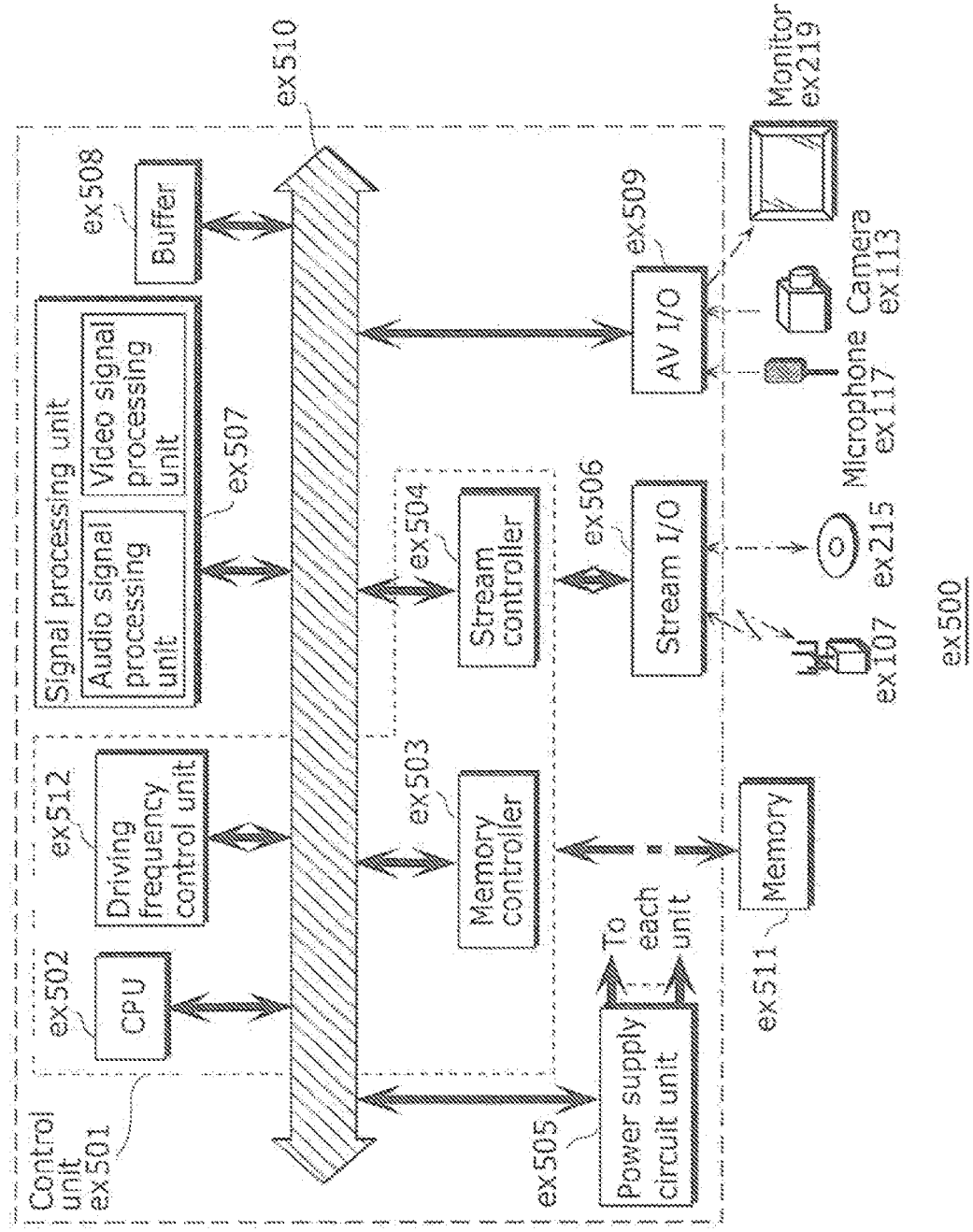
FIG. 31 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method and/or the moving picture decoding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Embodiment 12

When video data generated in the moving picture coding method or by the moving picture coding apparatus described in each of embodiments is decoded, it is possible for the processing amount to increase compared to when video data that conforms to a conventional standard, such as MPEG-2, MPEG-4 AVC, and VC-1 is decoded. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 32:
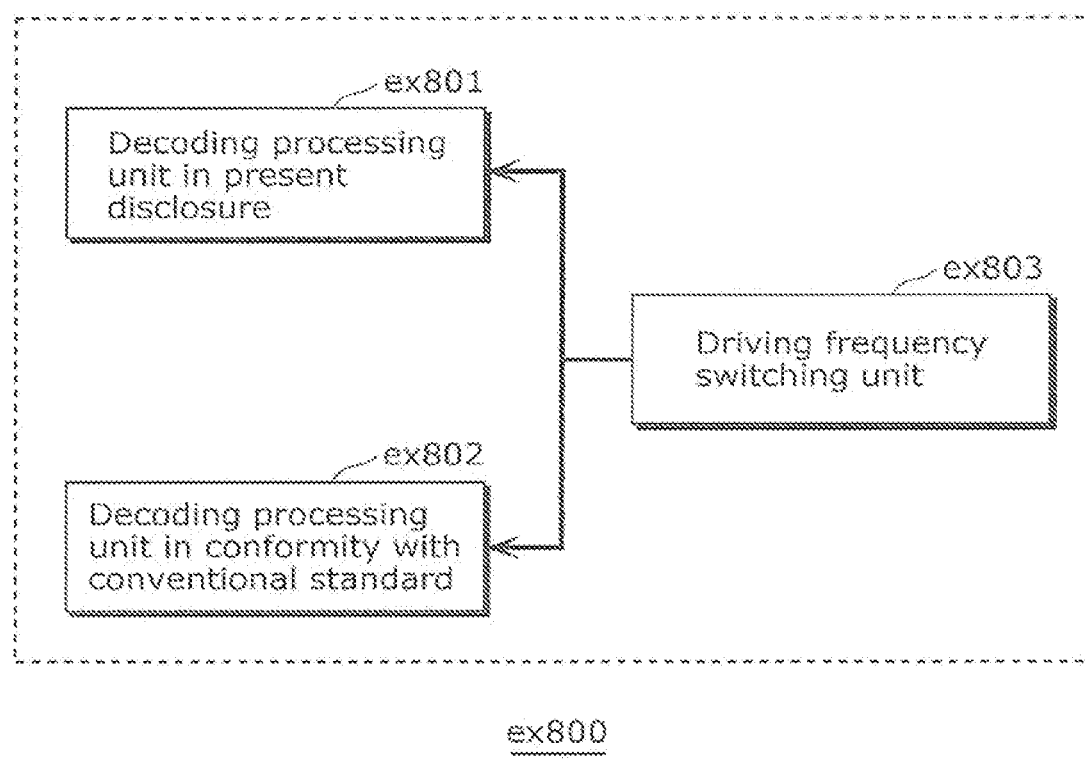
FIG. 32 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 32 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 31. Here, each of the decoding processing unit ex801 that executes the moving picture decoding method described in each of embodiments and the decoding processing unit ex802 that conforms to the conventional standard corresponds to the signal processing unit ex507 in FIG. 31. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, it is possible that the identification information described in Embodiment 10 is used for identifying the video data. The identification information is not limited to the one described in Embodiment 10 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34. The driving frequency can be selected by storing the look-up table in the buffer ex508 and in an internal memory of an LSI, and with reference to the look-up table by the CPU ex502.

Figure 33:
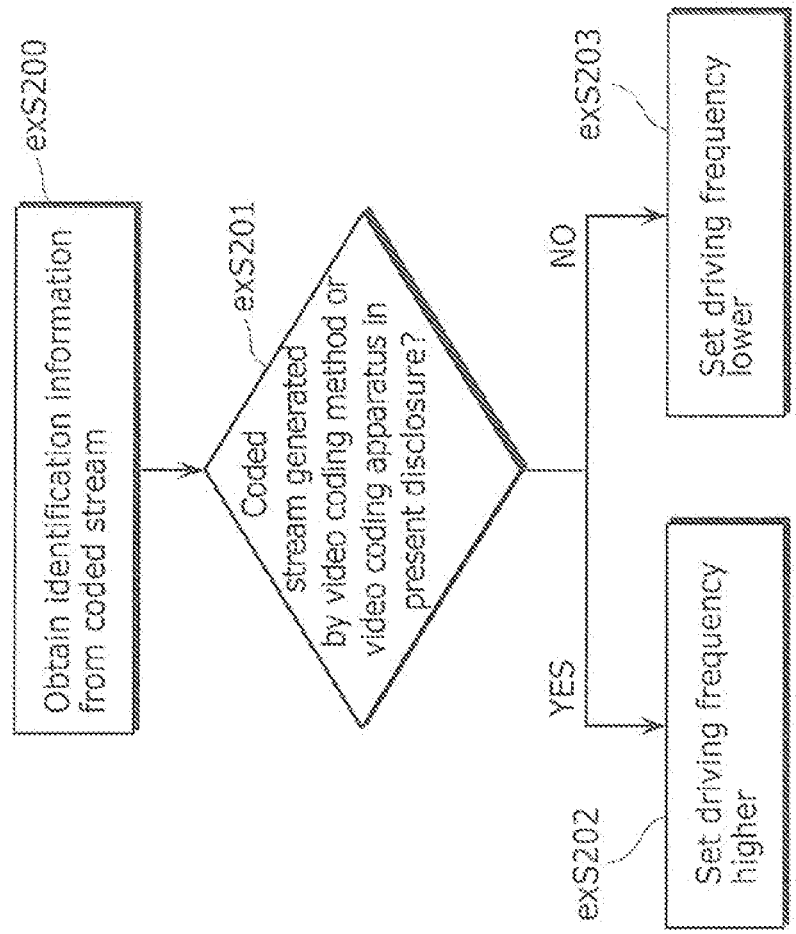
FIG. 33 shows steps for identifying video data and switching between driving frequencies.

FIG. 33 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, it is possible that the voltage to be applied to the LSI ex500 or the apparatus including the LSI ex500 is set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, it is possible that the driving frequency is set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, it is possible that the voltage to be applied to the LSI ex500 or the apparatus including the LSI ex500 is set higher. When the identification information indicates that the video data conforms to the conventional standard, such as MPEG-2, MPEG-4 AVC, and VC-1, it is possible that the voltage to be applied to the LSI ex500 or the apparatus including the LSI ex500 is set lower. As another example, it is possible that, when the identification information indicates that the video data is generated by the moving picture coding method and the moving picture coding apparatus described in each of embodiments, the driving of the CPU ex502 is not suspended, and when the identification information indicates that the video data conforms to the conventional standard, such as MPEG-2, MPEG-4 AVC, and VC-1, the driving of the CPU ex502 is suspended at a given time because the CPU ex502 has extra processing capacity. It is possible that, even when the identification information indicates that the video data is generated by the moving picture coding method and the moving picture coding apparatus described in each of embodiments, in the case where the CPU ex502 has extra processing capacity, the driving of the CPU ex502 is suspended at a given time. In such a case, it is possible that the suspending time is set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 13

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 35A:
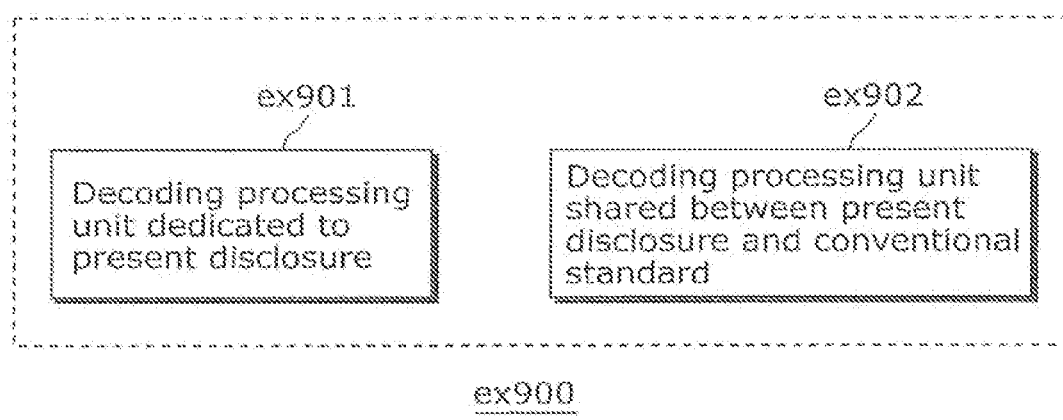
FIG. 35A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 35A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. It is possible for a decoding processing unit ex902 that conforms to MPEG-4 AVC to be shared by common processing operations, and for a dedicated decoding processing unit ex901 to be used for processing which is unique to an aspect of the present disclosure and does not conform to MPEG-4 AVC. The decoding processing unit for implementing the moving picture decoding method described in each of embodiments may be shared for the processing to be shared, and a dedicated decoding processing unit may be used for processing unique to that of MPEG-4 AVC.

Figure 35B:
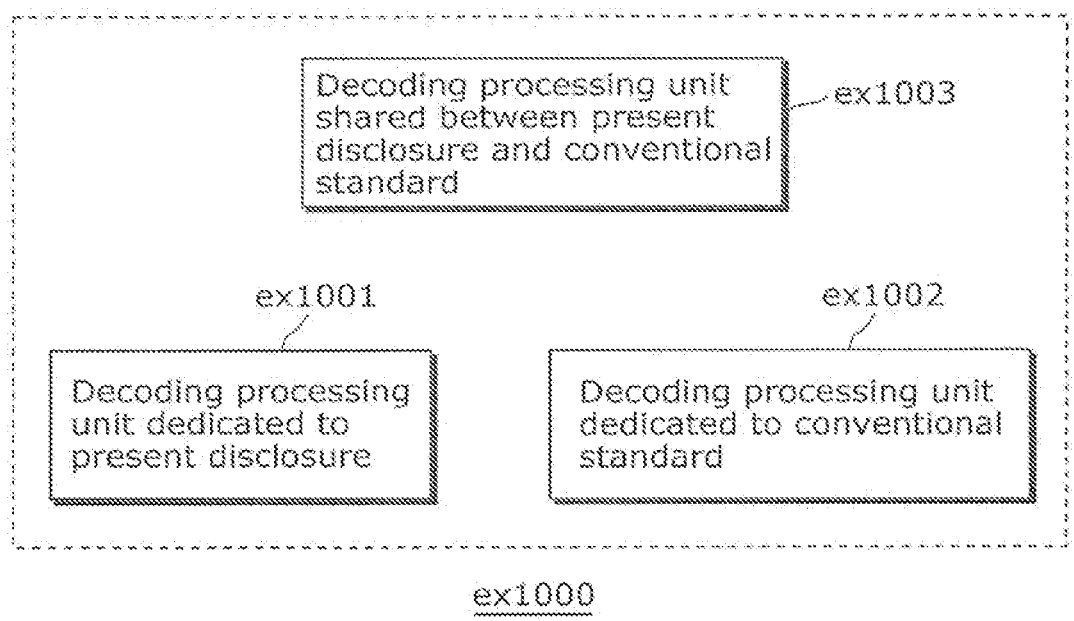
FIG. 35B is a diagram showing another example of a configuration for sharing a module of the signal processing unit.

Furthermore, ex1000 in FIG. 35B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing un it for the processing to be shared between the moving picture de coding method according to the aspect of the present disclosure a nd the moving picture decoding method in conformity with the co nventional standard.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing an image coding apparatus and an image decoding apparatus according to each of the embodiments is a program described below.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

INDUSTRIAL APPLICABILITY

An image coding method and an image decoding method according to the present disclosure can be applied to various multimedia data. The image coding method and the image decoding method according to the present disclosure is useful as an image coding method and an image decoding method in storage, transmission, communication, and the like using a mobile phone, a DVD device, a personal computer, and the like.

The invention claimed is:
1. An image encoding method of performing encoding processing of a picture on a slice basis, the image encoding method comprising:

encoding, into a bitstream, a dependent slice enabling flag indicating whether or not a dependent slice is enabled for the picture, wherein the dependent slice is a slice on which the encoding processing is performed by partially using control information included in a header of a slice different from the dependent slice, encoding, into the bitstream, a slice address indicating a starting position of a current slice of the picture, and encoding, into the bitstream, a dependency indication indicating whether or not the current slice is the dependent slice;

wherein, when the dependency indication indicates the slice is an independent slice, a context table of arithmetic encoding is initialized, when the dependency indication indicates the slice is the dependent slice, the context table of arithmetic encoding is not initialized, the dependent slice enabling flag is disposed in a parameter set common to all slices of the picture, the slice address is disposed in a slice header of the current slice, and the dependency indication is disposed in the slice header of the current slice before the slice address and after a syntax element identifying the parameter set.

2. The image encoding method according to claim 1, wherein the dependency indication is encoded into the bitstream when the dependent slice enabling flag indicates the dependent slice is enabled for the picture.

3. The image encoding method according to claim 1, wherein the dependent slice enabling flag is disposed at a beginning of the parameter set.

4. The image encoding method according to claim 1, wherein the dependency indication is not included in a slice header of a slice which is processed first for the picture.

5. The image encoding method according to claim 1, wherein the encoding of the dependent slice does not initialize CABAC context tables.

6. The image encoding method according to claim 1, wherein the encoding of the slice different from the dependent slice initializes CABAC context tables.

7. An image encoding apparatus which performs encoding processing of a picture on a slice basis, the image encoding apparatus comprising:

an encoder, which encodes into a bitstream:

a dependent slice enabling flag indicating whether or not a dependent slice is enabled for the picture, wherein the dependent slice is a slice on which the encoding processing is performed by partially using control information included in a header of a slice different from the dependent slice, a slice address indicating a starting position of a current slice of the picture, and a dependency indication indicating whether or not the current slice is the dependent slice;

wherein, when the dependency indication indicates the slice is an independent slice, a context table of arithmetic encoding is initialized, when the dependency indication indicates the slice is the dependent slice, the context table of arithmetic encoding is not initialized, the dependent slice enabling flag is disposed in a parameter set common to all slices of the picture, the slice address is disposed in a slice header of the current slice, and the dependency indication is disposed in the slice header of the current slice before the slice address and after a syntax element identifying the parameter set.

* * * * *